(12) United States Patent
Fujishiro et al.

(10) Patent No.: US 11,949,490 B2
(45) Date of Patent: Apr. 2, 2024

(54) RELAY APPARATUS

(71) Applicant: KYOCERA Corporation, Kyoto (JP)

(72) Inventors: Masato Fujishiro, Yokohama (JP);
Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 560 days.

(21) Appl. No.: 17/166,893

(22) Filed: Feb. 3, 2021

(65) Prior Publication Data

US 2021/0159968 A1    May 27, 2021

Related U.S. Application Data

(63) Continuation of application No. PCT/JP2019/031188, filed on Aug. 7, 2019.

(Continued)

(51) Int. Cl.
*H04B 7/14* (2006.01)
*H04B 7/155* (2006.01)
*H04L 5/00* (2006.01)

(52) U.S. Cl.
CPC ........... *H04B 7/155* (2013.01); *H04L 5/0055* (2013.01)

(58) Field of Classification Search
CPC ..... H04B 7/155; H04B 7/2606; H04L 5/0055; H04L 2001/0097; H04W 88/04; H04W 16/26

(Continued)

(56) References Cited

U.S. PATENT DOCUMENTS

| 8,018,890 B2 * | 9/2011 | Venkatachalam ....... H04L 1/188 370/279 |
| 2009/0024895 A1 | 1/2009 | Lin |

(Continued)

FOREIGN PATENT DOCUMENTS

| CN | 101986592 A | 3/2011 |
| JP | 2009-219099 A | 9/2009 |
| WO | 2017196249 A1 | 11/2017 |

OTHER PUBLICATIONS

Nokia, Nokia Shanghai Bell; "Text Proposal on end to end reliability in IAB"; 3GPP TSG-RAN WG2 Meeting NR Adhoc 1807; R2-1810811; Jul. 2-6, 2018; total 4 pages; Montreal, Canada.

(Continued)

*Primary Examiner* — Temica M Beamer
(74) *Attorney, Agent, or Firm* — Studebaker & Brackett PC

(57) ABSTRACT

A relay apparatus according to an embodiment is for use in a mobile communication system. The relay apparatus comprises: a reception side RLC entity configured to receive data from a first communication apparatus; and a transmission side RLC entity configured to transmit, to a second communication apparatus, the data received by the reception side RLC entity. The transmission side RLC entity is configured to receive, from the second communication apparatus, a first acknowledgement indicating that the second communication apparatus has successfully received the transmitted data. The reception side RLC entity is configured to transmit, to the first communication apparatus, a second acknowledgement indicating that the reception side RLC entity has successfully received the data after waiting until the transmission side RLC entity receives the first acknowledgement.

5 Claims, 14 Drawing Sheets

Related U.S. Application Data

(60) Provisional application No. 62/715,959, filed on Aug. 8, 2018.

(58) Field of Classification Search
USPC .......................................................... 370/315
See application file for complete search history.

(56) References Cited

U.S. PATENT DOCUMENTS

| | | | |
|---|---|---|---|
| 2009/0049356 A1 | 2/2009 | Lin | |
| 2010/0315989 A1* | 12/2010 | Reznik | H04B 7/15557 |
| | | | 370/315 |
| 2012/0140704 A1* | 6/2012 | Zhao | H04L 1/1874 |
| | | | 370/315 |
| 2018/0220337 A1* | 8/2018 | Yu | H04W 28/0273 |

OTHER PUBLICATIONS

Ericsson; "Layer 2 Functions for Multi-hop IAB System"; 3GPP TSG-RAN WG2 #102; R2-1806814; May 21-25, 2018; pp. 1-6; Busan, Republic of Korea.

Huawei, HiSilicon; "Further comparison between hop-by-hop ARQ and E2E ARQ"; 3GPP TSG-RAN WG2 Ad Hoc; R2-1810678; Jul. 2-6, 2018; total 5 pages; Montreal, Canada.

AT&T, KDDI; "Lossless Data Transfer for IAB Design with Hop-by-Hop RLC ARG"; 3GPP TSG-RAN WG2 AH-1807; R2-1810382; Jul. 2-6, 2018; total 6 pages; Montreal, Canada.

\* cited by examiner

FIG. 7

| IAB NODE | DONOR CANDIDATE 1 | DONOR CANDIDATE 2 | DONOR CANDIDATE 3 | DONOR CANDIDATE 4 |
|---|---|---|---|---|
| IAB NODE#1 | gNB#1 | gNB#2 | gNB#3 | - |
| IAB NODE#2 | gNB#1 | gNB#3 | - | - |
| IAB NODE#3 | gNB#1 | gNB#4 | gNB#5 | gNB#6 |

OPTION 1: IAB DONOR'S DIRECT DELIVERY STATUS

OPTION 2: "BUCKET RELAY" OF HOP-BY-HOP ACK

_US 11,949,490 B2_

RELAY APPARATUS

RELATED APPLICATIONS

The present application is a continuation based on PCT Application No. PCT/JP2019/031188, filed on Aug. 7, 2019, which claims the benefit of U.S. Provisional Application No. 62/715,959 filed on Aug. 8, 2018. The content of which is incorporated by reference herein in their entirety.

TECHNICAL FIELD

The present disclosure relates to a relay apparatus.

BACKGROUND ART

The 3rd Generation Partnership Project (3GPP), which is a standardization project for mobile communication systems, is studying a new relay apparatus called an Integrated Access and Backhaul (IAB) node. One or a plurality of relay apparatuses are involved in communications between a base station and user equipment, and relay the communications. Such a relay apparatus has a user equipment function and a base station function, uses the user equipment function to perform radio communications with an upper node (base station or upper relay apparatus), and uses the base station function for performing radio communications with a lower node (user equipment or lower relay apparatus).

A radio section between the user equipment and the relay apparatus or the base station may be referred to as an access link. A radio section between the relay apparatus and the base station or another relay apparatus may be referred to as a backhaul link. 3GPP Contribution RP-170217 describes a method of integrating and multiplexing data communications in the access link and data communications in the backhaul link in Layer 2, and dynamically allocating radio resources to the backhaul link to dynamically switch the data transfer route.

SUMMARY

A relay apparatus according to an embodiment is for use in a mobile communication system. The relay apparatus comprises: a reception side RLC entity configured to receive data from a first communication apparatus; and a transmission side RLC entity configured to transmit, to a second communication apparatus, the data received by the reception side RLC entity. The transmission side RLC entity is configured to receive, from the second communication apparatus, a first acknowledgement indicating that the second communication apparatus has successfully received the transmitted data. The reception side RLC entity is configured to transmit, to the first communication apparatus, a second acknowledgement indicating that the reception side RLC entity has successfully received the data after waiting until the transmission side RLC entity receives the first acknowledgement.

A relay apparatus according to an embodiment is for use in a mobile communication system The relay apparatus comprises a reception side RLC entity configured to receive data from a first communication apparatus; a first transmission side RLC entity associated with a second communication apparatus; a second transmission side RLC entity associated with a third communication apparatus; and an upper entity configured to provide, to the first transmission side RLC entity, the data received by the reception side RLC entity, and to hold the data. The upper entity is configured to provide the held data to the second transmission side RLC entity in response to a deterioration of a radio condition between the relay apparatus and the second communication apparatus or to switching a data transfer path from the second communication apparatus to the third communication apparatus.

BRIEF DESCRIPTION OF DRAWINGS

FIG. 7 is a diagram illustrating an example of a table for determining a context transfer destination according to the first embodiment.

DESCRIPTION OF EMBODIMENTS

Figure 1:
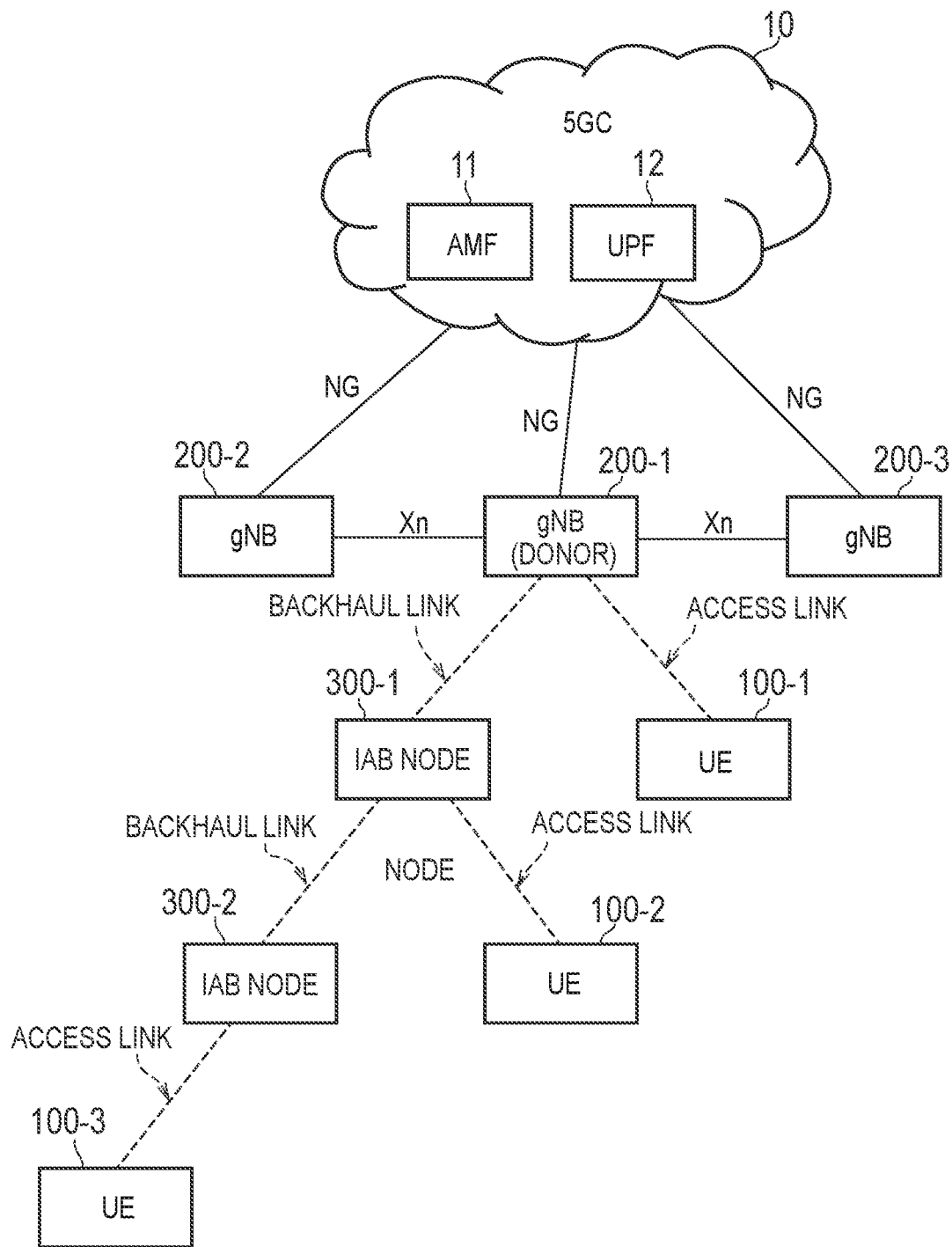
FIG. 1 is a diagram illustrating a configuration of a mobile communication system according to an embodiment.

A mobile communication system according to one embodiment will be described with reference to the accompanying drawings. Note that in the descriptions of the drawing below, identical or similar symbols are assigned to identical or similar portions.

First Embodiment (A Configuration of a Mobile Communication System)

A configuration of a mobile communication system according to this embodiment will be described. FIG. 1 is a diagram illustrating a configuration of a mobile communication system 1 according to this embodiment. The mobile communication system 1 is a 5G mobile communication system based on 3GPP standard. In particular, a radio access format in the mobile communication system 1 is NR (New Radio) which is a radio access format of 5G. However, LTE (Long Term Evolution) may be applied to the mobile communication system 1 at least partially.

As shown in FIG. 1, the mobile communication system 1 comprises a 5G core network (5GC) 10, a user equipment (UE) 100, a base station (referred to as gNB) 200, and an IAB node 300. In this embodiment, an example in which the base station is an NR base station will be mainly described, but the base station may be an LTE base station (i.e., an eNB).

The 5GC10 comprises an AMF (Access and Mobility Management Function) 11 and an UPF (User Plane Function) 12. The AMF 11 is an apparatus which performs various mobility control with respect to the UE 100, and the like. The AMF 11 manages information of an area in which the UE 100 exists by using non-access stratum (NAS) signaling to communicate with the UE 100. The UPF 12 is an apparatus which performs data transfer control, and like.

The gNB 200 is connected to the 5GC 10 via an interface referred to as an NG interface. In FIG. 1, three gNB 200-1 to gNB 200-3 connected to the 5GC 10 are illustrated. The gNB 200 is a fixed radio communication device which performs radio communication with the UE 100. When the gNB 200 has a donor function, the gNB 200 may perform radio communication with an IAB node which wirelessly connects to itself.

The gNB 200 is connected to another gNB 200 in an adjacent relationship via an inter-base station interface referred to as an Xn interface. FIG. 1 shows an example in which the gNB200-1 is connected to the gNB200-2 and the gNB200-2.

Each of the gNB 200 manages one or a plurality of cells. A cell is used as a term indicating the smallest unit of a radio communications area. A cell is also used as a term indicating a function or resource which performs radio communications with the UE 100. One cell belongs to one carrier frequency.

The UE 100 is a mobile radio communication device that performs radio communication with the gNB 200. The UE 100 may communicate with the IAB node 300. The UE 100 may be any device as long as it is a device that performs radio communication with the gNB 200 or the IAB node 300. For example, the UE 100 is a mobile phone terminal, a tablet terminal, a notebook PC, a sensor, a device installed in the sensor, a vehicle, or a device installed in vehicle.

FIG. 1 shows an example in which the UE 100-1 wirelessly connects to the gNB 200-1, the UE 100-2 wirelessly connects to the IAB node 300-1, and the UE 100-3 wirelessly connects to the IAB 300-2. The UE 100-1 directly communicates with the gNB 200-1. The UE 100-2 indirectly communicates with the gNB 200-1 via the IAB node 300-1. The UE 100-3 indirectly communicates with the gNB 200-1 via the IAB node 300-1 and the IAB node 300-2.

An IAB node 300 is a device (relay apparatus) that is involved in communications between an eNB 200 and a UE 100 and relays the communications. FIG. 1 illustrates an example in which an IAB node 300-1 is in radio connection with a gNB 200-1 serving as a donor and an IAB node 300-2 is in wireless connection with the IAB node 300-1. Each IAB node 300 manages a cell. The cell managed by the IAB node 300 may have a cell ID that may be the same as or different from the cell ID of the cell of the donor gNB 200-1.

The IAB node 300 has a UE function (user equipment function) and a gNB function (base station function). The IAB node 300 uses the UE function to perform radio communications with a upper node (the gNB 200 or a upper IAB node 300), and also uses the gNB function to perform radio communications with a lower node (UE 100 or lower IAB node 300). The UE function is at least a part of the functions of the UE 100, and the IAB node 300 does not necessarily need to have all the functions of the UE 100. The gNB function is at least a part of the functions of the gNB 200, and the IAB node 300 does not necessarily need to have all the functions of the gNB 200.

A radio section between the UE 100 and the IAB node 300 or gNB 200 may be referred to as an access link (or Uu). A radio section between the IAB node 300 and the gNB 200 or another IAB node 300 may be referred to as a backhaul link (or Un). Such a backhaul link may be referred to as a fronthaul link.

A relay route can be dynamically switched by integrating and multiplexing data communications in the access link and data communications in the backhaul link in Layer 2, and dynamically allocating radio resources to data communications in the backhaul link A millimeter wave band may be used for the access link and the backhaul link. In addition, the access link and the backhaul link may be time division and/or frequency division multiplexed.

(A Configuration of gNB)

Figure 2:
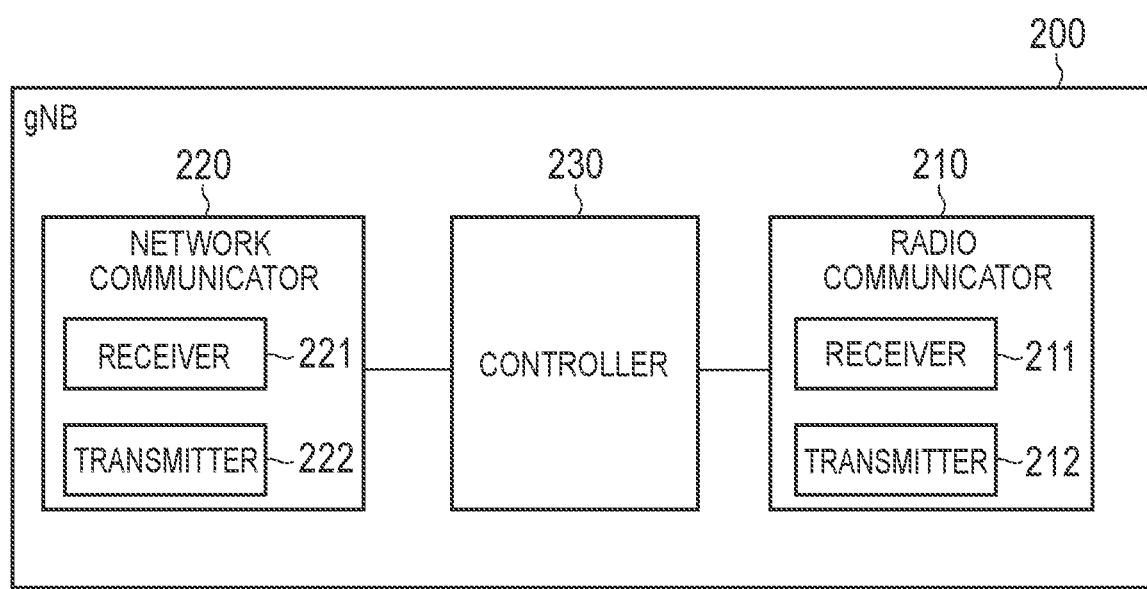
FIG. 2 is a diagram illustrating a configuration of a base station (gNB) according to the embodiment.

A configuration of the gNB 200 according to this embodiment will be described. FIG. 2 is a diagram illustrating a configuration of the gNB 200. As shown in FIG. 2, the gNB 200 comprises a radio communicator 210, a network communicator 220, and a controller 230.

The radio communicator 210 is used for radio communication with the UE 100 and radio communication with the IAB node 300. The radio communicator 210 includes a receiver 211 and a transmitter 212. The receiver 211 performs various receptions under the control of the controller 230. The receiver 211 includes an antenna and converts a radio signal received by the antenna into a baseband signal (received signal) and outputs the baseband signal to the controller 230. The transmitter 212 performs a variety of transmission under the control of the controller 230. The transmitter 212 includes an antenna and converts the baseband signal (transmitted signal) output from the controller 230 into the radio signal and transmits the radio signal from the antenna.

The network communicator 220 is used for wired communication (or wireless communication) with the 5GC 10 and wired communication (or wireless communication) with another adjacent gNB 200. The network communicator 220 includes a receiver 221 and a transmitter 222. The receiver 221 performs various receptions under the control of the controller 230. The receiver 221 receives a signal from the outside and outputs the reception signal to the controller 230. The transmitter 222 performs a variety of transmission under the control of the controller 230. The transmitter 222 transmits, to the outside, a transmission signal output from the controller 230.

The controller 230 performs various controls in the gNB 200. The controller 230 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(A Configuration of IAB Node)

Figure 3:
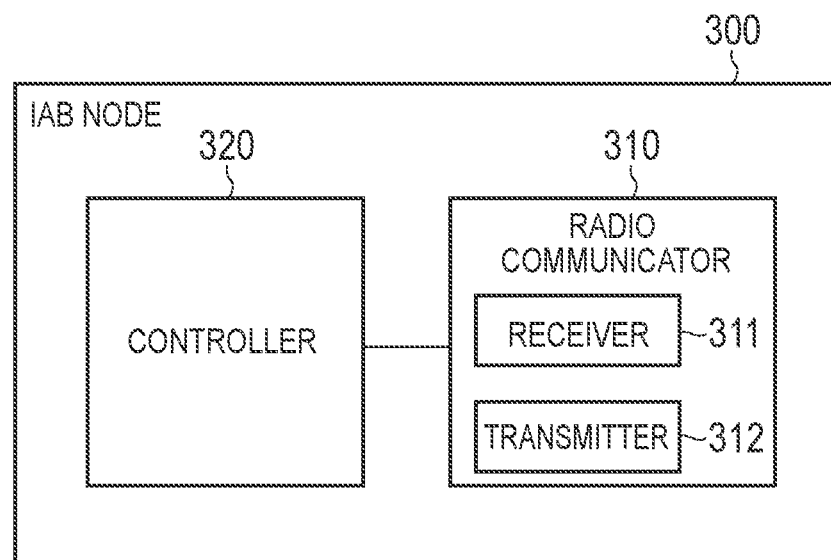
FIG. 3 is a diagram illustrating a configuration of a relay apparatus (IAB node) according to the embodiment.

A configuration of the IAB node 300 according to an embodiment will be described. FIG. 3 is a diagram illustrating a configuration of the IAB node 300. As shown in FIG. 3, the IAB node 300 comprises a radio communicator 310 and a controller 320.

The radio communicator 310 is used for radio communication with the gNB 200 (backhaul link) and radio communication with the UE 100 (access link) The radio communicator 310 includes a receiver 311 and a transmitter 312. The receiver 311 performs various receptions under the control of the controller 320. The receiver 311 includes an antenna and converts a radio signal received by the antenna into a baseband signal (received signal) and outputs the baseband signal to the controller 320. The transmitter 312 performs a variety of transmission under the control of the controller 320. The transmitter 312 includes an antenna and converts the baseband signal (transmitted signal) output from the controller 320 into the radio signal and transmits the radio signal from the antenna.

The controller 320 performs various controls in the IAB node 300. The controller 320 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(A Configuration of UE)

Figure 4:
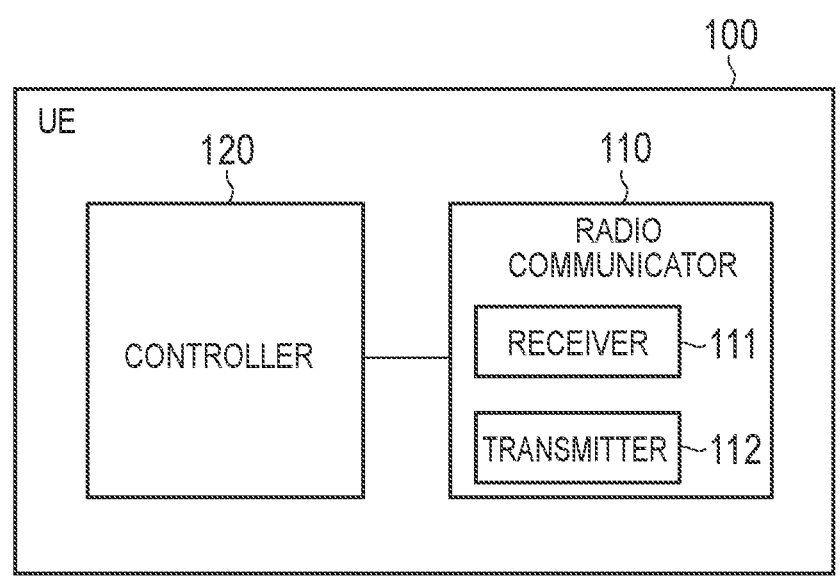
FIG. 4 is a diagram illustrating a configuration of a user equipment (UE) according to the embodiment.

A configuration of the UE 100 according to this embodiment will be described. FIG. 4 is a diagram illustrating a configuration of the UE 100. As shown in FIG. 4, the UE 100 comprises a radio communicator 110 and a controller 120.

The radio communicator 110 is used for radio communication in access link, i.e., radio communication with the gNB 200 and radio communication with the IAB node 300. The radio communicator 110 includes a receiver 111 and a transmitter 112. The receiver 111 performs various receptions under the control of the controller 120. The receiver 111 includes an antenna and converts a radio signal received by the antenna into a baseband signal (received signal) and outputs the baseband signal to the controller 120. The transmitter 112 performs a variety of transmission under the control of the controller 120. The transmitter 112 includes an antenna and converts the baseband signal (transmitted signal) output from the controller 120 into the radio signal and transmits the radio signal from the antenna.

The controller 120 performs various controls in the UE 100. The controller 120 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(Example of Protocol Stack Configuration)

Figure 5:
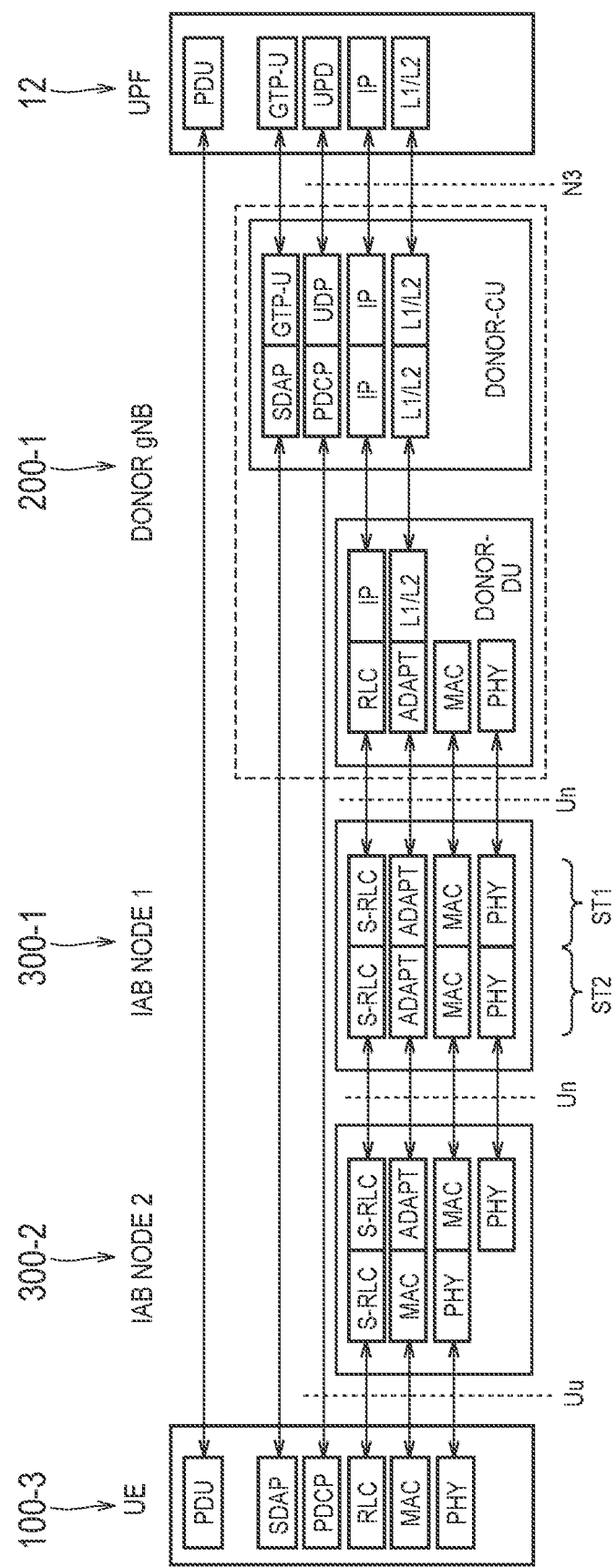
FIG. 5 is a diagram illustrating an example of a protocol stack configuration of a user plane in the mobile communication system according to the embodiment.

An example of a protocol stack configuration in the mobile communication system 1 according to this embodiment will be described. FIG. 5 is a diagram illustrating an example of a protocol stack configuration of a user plane. Here, an example of a protocol stack configuration related to user data transmission between a UE 100-3 and a UPF 12 in a 5GC 10 illustrated in FIG. 1 will be described.

As illustrated in FIG. 5, the UPF 12 includes a GPRS Tunneling Protocol for User Plane (GTP-U), User Datagram Protocol (UDP), Internet Protocol (IP), and Layer 1/Layer 2 (L1/L2). The gNB 200-1 (donor gNB) is provided with a protocol stack corresponding to these.

The gNB 200-1 includes a central unit (CU) and a distributed unit (DU). In the protocol stack of the radio interface, Packet Data Convergence Protocol (PDCP) and higher layers are provided to the CU, and Radio Link Control (RLC) and lower layers are provided to the DU. The CU and the DU are connected to each other via an interface referred to as an F1 interface.

Specifically, the CU includes Service Data Adaptation Protocol (SDAP), PDCP, IP, and L1/L2. SDAP and PDCP of the CU communicate with SDAP and PDCP of the UE 100 via the DU, the IAB node 300-1, and the IAB node 300-2.

The DU includes an RLC, an adaptation layer (Adapt), Medium Access Control (MAC), and a Physical layer (PHY) in the protocol stack of the radio interface. A protocol stack of these is a protocol stack for a gNB. The hierarchical relationship between the adaptation layer and the RLC (S-RLC) may be reversed.

The IAB node 300-1 is provided with a protocol stack ST1 that is for UE and corresponds to these. Furthermore, the IAB node 300-1 is provided with a protocol stack ST2 for gNB. The protocol stack ST1 and the protocol stack ST2 each include Layer 2 and lower layers (sublayers). Thus, the IAB node 300-1 is a Layer 2 relay apparatus that relays user data using Layer 2 and lower layers. The IAB node 300-1 performs relays the data without using Layer 3 and higher layers (specifically, PDCP and higher layers). The IAB node 300-2 has a protocol stack configuration similar to that of the IAB node 300-1.

The protocol stack configuration in the user plane is as described above. In a control plane on the other hand, the gNB 200-1, the IAB node 300-1, the IAB node 300-2, and the UE 100-3 each have Radio Resource Control (RRC) corresponding to Layer 3.

An RRC connection is established between the RRC of the gNB 200-1 (donor gNB) and the RRC of the IAB node 300-1, and RRC messages are transmitted and received using this RRC connection. An RRC connection is established between the RRC of the gNB 200-1 and the RRC of the IAB node 300-2, and RRC messages are transmitted and received using this RRC connection. Furthermore, an RRC connection is established between the RRC of the gNB 200-1 and the RRC of the UE 100-3, and RRC messages are transmitted and received using this RRC connection.

(Operation in the Mobile Communication System)

An operation in the mobile communication system 1 according to this embodiment will be described. Specifically, an operation performed in a case where the IAB node 300-1 establishes a radio connection to the gNB 200-1 (donor gNB) will be described.

In such a case, the IAB node 300-1 first establishes an access link connection (first radio connection) with the gNB 200-1 by using the UE function. In other words, the IAB node 300-1 functions as the UE 100 to establish an access link connection with gNB 200-1. The establishment of the access link connection includes establishment of the RRC connection.

Next, the gNB 200-1 transmits to the IAB node 300-1, a message for establishing a backhaul link connection (second radio connection) between the IAB node 300-1 and the gNB 200-1 for the gNB function of the IAB node 300-1, while maintaining the access link connection. In this embodiment, this message is an RRC Reconfiguration message transmitted and received using the RRC connection.

As a result, the backhaul link connection is established between the IAB node 300-1 and the gNB 200-1, whereby backhaul link communications between the IAB node 300-1 and the gNB 200-1 can be started properly.

The RRC reconfiguration message for establishing the backhaul link connection may include configuration information on a bearer (or L2 link) forming the backhaul link connection, and a cell ID (specifically, transmission configuration on a reference signal and a synchronization signal associated with the cell ID) to be transmitted by the IAB node 300-1. Such an RRC reconfiguration message will be hereinafter referred to as an IAB node configuration message.

The IAB node configuration message may include configuration information on a default bearer (or default link) The default bearer (or default link) is, for example, a bearer (or link) for relaying SIB (System Information Block) and relaying Msg3 from UE.

The IAB node configuration message may include configuration information on the stack on the side of the donor gNB 200-1 and may optionally include configuration information on the stack on the side of the IAB node 300-2 (or UE 100). The configuration information on the stack on the side of the IAB node 300-2 (or UE 100) may be configured (in advance) by an operator (OAM) or a group of configurations implicitly notified using the SIB of the donor gNB 200-1 may be reused therefor.

The configuration contents in the IAB node configuration message basically include all the configurations included in the RRC reconfiguration message, and may also include an RLC configuration (an operation mode such as Acknowledged Mode (AM)/Unacknowledged Mode (UM)/Transparent Mode (TM), Logical Channel Prioritization (LCP) parameter, and the like), a MAC configuration (such as Buffer Status Report (BSR)/Timing Advance Group (TAG)/Power Headroom (PHR) parameters, and Discontinues Reception (DRX) configuration), and PHY configuration.

The configuration contents in the IAB node configuration message may further include a configuration of an adaptation layer (such as mapping (routing) configuration and priority configuration of lower side or higher side logical channel).

Furthermore, the configuration contents in the IAB node configuration message may include the (virtual) IP address (that is, the L3 address) of the IAB node 300-1 as appropriate. This is because the F1 protocol stack assumes SCTP over IP to be used for establishing an F1 interface on an L2 link for example.

The configuration contents in the IAB node configuration message is not limited to the configuration information on the NR protocol, but may be configuration information on the LTE protocol (RLC, MAC, PHY).

In this embodiment, the IAB node 300-1 may transmit, to the gNB 200-1, an indication indicating that the IAB node 300-1 has the function of the IAB node (that is, the Layer 2 relay function) before establishment of the backhaul link connection or requests establishment of the backhaul link connection. This enables the gNB 200-1 to properly initiate a procedure for establishing the backhaul link connection. Hereinafter, such an indication will be referred to as an IAB indication. The IAB indication may include information indicating intention or capability for preparing the link protocol stack for the UE function in the IAB node 300-1 with LTE, NR, or both.

Note that the IAB node 300-1 may transmit the IAB indication after establishing the access link connection with the gNB 200-1, or transmit the IAB indication during the procedure for establishing the access link connection with gNB 200-1.

Furthermore, a condition for enabling the IAB indication to be transmitted to the gNB may include a condition that, from the gNB, the SIB including a donor function identifier indicating the gNB has the donor function has been received. Under such a condition, the IAB node 300-1 transmits the IAB indication to the gNB 200-1 only when the donor function identifier is received from the gNB 200-1 by the SIB.

In this embodiment, when the gNB 200-1 has the donor function for establishing the backhaul link connection with the IAB node 300-1, the gNB 200-1 that has received the IAB indication from the IAB node 300-1 may transmit the IAB node configuration message to the IAB node 300-1. On the other hand, when the gNB 200-1 does not have the donor function, the gNB 200-1 that has received the IAB indication from the IAB node 300-1 may transmit a handover request for requesting the handover of the IAB node 300-1 to another gNB, instead of transmitting the IAB node configuration message to the IAB node 300-1. Preferably, the gNB 200-1 has information on another gNB having the donor function, stored in advance. The gNB 200-1 may acquire the information on the other gNB having the donor function from the IAB node 300-1. The IAB node 300-1 acquires the information from the 5GC 10 (core network) or checks the SIB (donor function identifier) of the adjacent cell to acquire the information on the other gNB (adjacent cell) having the donor function, and notifies the gNB 200-1 of the acquired information. The gNB 200-1 transmits a handover request to the other gNB having the donor function based on the stored information or the information acquired from the IAB node 300-1. As a result, after the IAB node 300-1 has been handed over to the other gNB, the IAB node 300-1 can establish the backhaul link connection with the other gNB. Alternatively, when the gNB 200-1 does not have the donor function, the IAB node 300-1 requests the 5GC 10 to perform the handover to the cell (gNB) having the donor function, and the 5GC 10 may execute processing related to the handover.

In this embodiment, the gNB 200-1 may transmit a measurement configuration for configuring radio measurement to the IAB node 300-1 in response to the reception of the IAB indication from the IAB node 300-1. After receiving the measurement configuration from the gNB 200-1, the IAB node 300-1 transmits a measurement report including the result of the radio measurement to the gNB 200-1. The gNB 200-1 determines whether it (gNB 200-1) is the appropriate donor gNB or another gNB is the appropriate donor gNB, based on the measurement report from the IAB node 300-1. For example, based on the measurement reports, the gNB 200-1 determines that the other gNB is the appropriate donor gNB, when the measurement result for the other gNB is better than the own measurement result (for the gNB 200-1) with a difference between these measurement reports exceeding a threshold. Otherwise, the gNB 200-1 determines that it is the appropriate donor gNB.

Upon determining that it (gNB 200-1) is the appropriate donor gNB 200-1, the gNB 200-1 transmits an IAB node configuration message to the IAB node 300-1. Upon determining that another gNB is the appropriate donor gNB, the gNB 200-1 transmits a handover request for requesting the handover of the IAB node 300-1 to the other gNB, instead of transmitting the IAB node configuration message to the IAB node 300-1. Thus, after the IAB node 300-1 has been handed over to the other gNB under an excellent radio condition, the IAB node 300-1 can establish the backhaul link connection with the other gNB.

In this embodiment, the gNB 200-1 may transmit context information about the IAB node 300-1 to another gNB after establishing the backhaul link connection. This context information includes AS layer connection configuration on the radio side (content of RRC reconfiguration), PDU session resource configuration on the network side (such as UE ID and session ID, QoS (Quality of Service)/slice configuration of AMF or RAN (Radio Access Network)), and other related information (such as history information and preference information on behavior, communications, and the like of the IAB node.

Specifically, the gNB 200-1 transmits the context information about the IAB node 300-1 to another gNB in advance even without determining that the IAB node 300-1 is to be handed over to another gNB. Thus, when the radio condition between the gNB 200-1 and the IAB node 300-1 deteriorates and thus the IAB node 300-1 reestablishes the radio connection with another gNB, the reestablishment can be swiftly implemented using the context information shared in advance.

Here, the gNB 200-1 preferably holds a table in which the IAB node 300-1 is associated with candidates of the donor gNB for the IAB node 300-1. The gNB 200-1 transmits the context information to other gNBs that are the candidates in the table. This allows the gNB 200-1 to share the context information with the other appropriate gNBs.

(1) Example of Normal Operation Sequence

Figure 6:
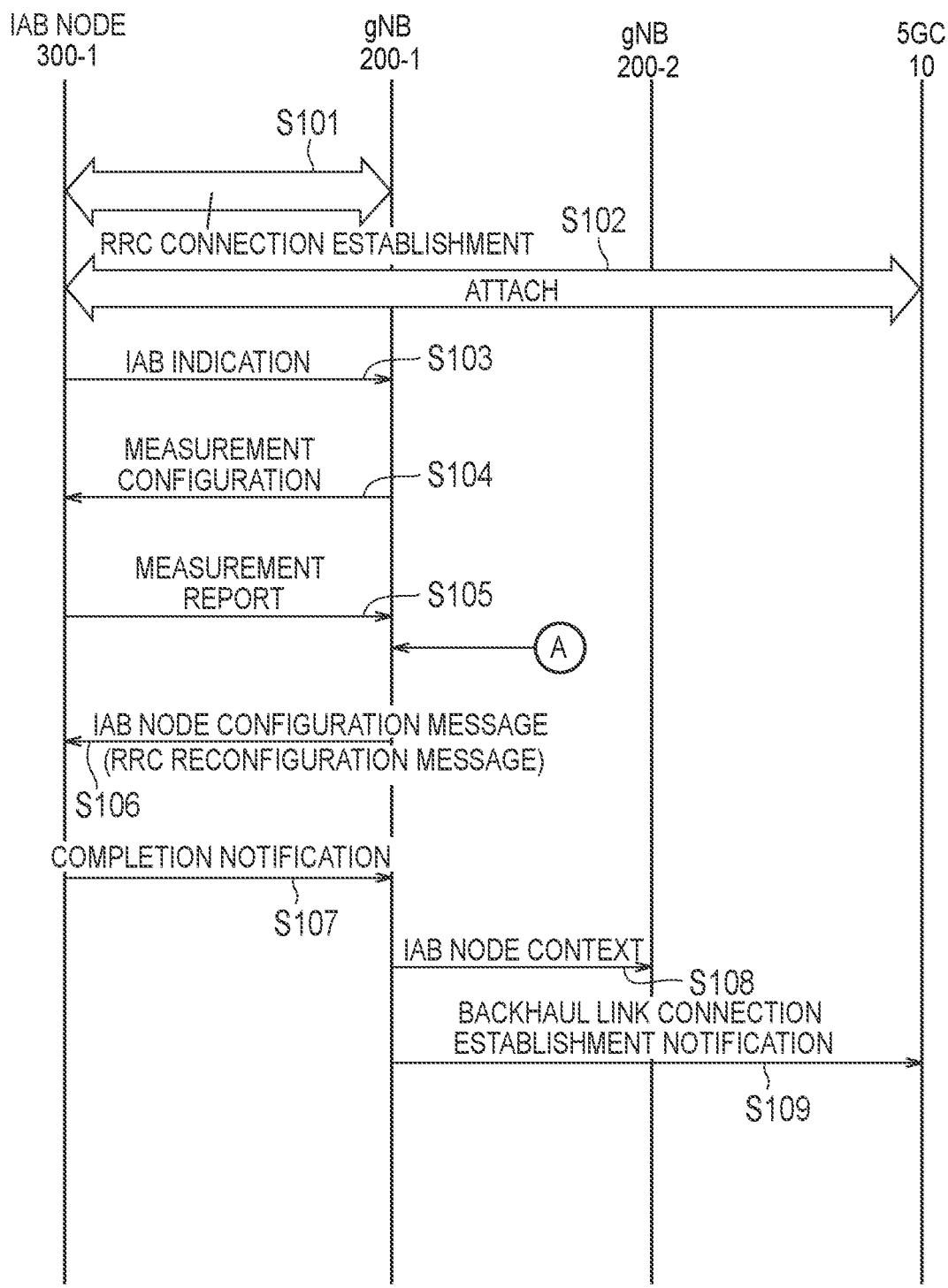
FIG. 6 is a diagram illustrating an example of a normal operation sequence according to a first embodiment.

FIG. 6 is a diagram illustrating an example of a normal operation sequence in the mobile communication system 1 according to this embodiment.

As illustrated in FIG. 6, in step S101, the IAB node 300-1 establishes an access link connection (RRC connection) with the gNB 200-1 by, for example, performing a random access procedure for the gNB 200-1. The IAB node 300-1 may provide the IAB indication in a message (e.g., Msg3) transmitted to the gNB 200-1 during the random access procedure. The gNB 200-1 acquires context information about the IAB node 300-1 in step S101.

In step S102, the IAB node 300-1 performs an attach procedure to the 5GC 10 (specifically, AMF 11) via the gNB 200-1. Here, the IAB node 300-1 may notify the AMF 11 of a notification such as the IAB indication (that is, a notification indicating an intention to function as an IAB node). Thus, the IAB node 300-1 may acquire the list of candidate donor gNBs (cells), routing information indicating presence/absence of a lower node, other management information, and the like from the AMF 11. Alternatively, context information such as information indicating that the IAB node 300-1 is attached to each candidate donor gNB and routing information of the IAB node 300-1 may be notified from the AMF 11. If the IAB node 300-1 is already attached, the attach processing in step S102 can be omitted. Specifically, the attach processing by the IAB node 300-1 is omitted when the connection with the donor gNB needs to be reestablished due to a certain error, as in the RRC reestablishment in step S101.

In step S103, the IAB node 300-1 transmits the IAB indication to the gNB 200-1. The transmission of the IAB indication by the IAB node 300-1 may be triggered by satisfaction of one or a plurality of the following events.

When Msg5 (RRC Complete) is transmitted.

When the connection with gNB is established (this may be Msg5 and after, for example, when the first RRC reconfiguration is done).

When IAB configuration information (refer to the above description) is acquired from the AMF (including a case where IAB configuration information is already held).

Simply when there is an intention to function as an IAB node (including receiving an instruction to function as an IAB node from a higher layer).

When request to function as an IAB node is received from a lower IAB node 300-2 or UE 100-3 (when a signal indicating such a request is received from the lower IAB node 300-2 or the UE 100-3).

When the lower IAB node 300-2 or the UE 100-3 is already connected.

The IAB node 300-1 transmits the RRC message including the IAB indication to the gNB 200-1, for example. Such an RRC message may be a "UE Capability Information" message indicating the capability to function as a UE. Note that if the IAB indication is transmitted in step S101, step S103 can be omitted.

Alternatively, the AMF 11 may notify the gNB 200-1 of the IAB indication in a form of a change in the PDU session resource. The AMF may be an AMF for IAB management (dedicated).

The description on this normal operation sequence is given under an assumption that the gNB 200-1 has the donor capability. The gNB 200-1 determines that the backhaul link connection needs to be established with the IAB node 300-1, based on the IAB indication.

In step S104, the gNB 200-1 transmits the measurement configuration for configuring the radio measurement, to the IAB node 300-1. The IAB node 300-1 performs the radio measurement based on the measurement configuration. For example, the IAB node 300-1 measures the received power (received power of the cell-specific reference signal) for the cell of the current serving cell gNB 200-1 and the cell of the adjacent cell gNB 200-2.

In step S105, IAB node 300-1 transmits a measurement report including the results of the radio measurement to the gNB 200-1. The gNB 200-1 determines whether it (gNB 200-1) is the appropriate donor gNB or another gNB is the appropriate donor gNB, based on the measurement report. Here, the description proceeds under an assumption that the gNB 200-1 has determined that it (gNB 200-1) is the appropriate donor gNB. The processing of steps S104 and S105 is not essential and may be omitted.

In step S106, the gNB 200-1 transmits an IAB node configuration message (RRC reconfiguration message) to the IAB node 300-1. The IAB node configuration message may include a handover instruction designating the cell of the gNB 200-1 (i.e., the current serving cell of the IAB node 300-1) as the handover destination. The IAB node 300-1 executes processing of establishing a backhaul link connection with the gNB 200-1 based on the IAB node configuration message. Such establishment processing includes processing of generating a protocol stack (adaptation/RLC/MAC/PHY entity) for the backhaul link and configuring parameters based on the configuration information in the IAB node configuration message. Such establishment processing may include processing of preparing a protocol stack on the UE side (for an access link) and starting transmission of a synchronization signal or a cell-specific reference signal (or processing of preparing for the start).

In step S107, the IAB node 300-1 transmits a completion notification message to the gNB 200-1. The message indicates that the IAB node configuration, including the establishment of the backhaul link connection, has been completed. After step S107, the IAB node 300-1 functions as an IAB node instead of functioning as a UE, for the gNB 200-1.

In step S108, the gNB 200-1 transfers the context information acquired in step S101 to the gNB 200-2 over an Xn interface. The gNB 200-1 holds a table that associates the IAB node 300-1 with the candidate of the donor gNB of the IAB node 300-1, and determines the context transfer destination by referring to this table. With the gNB 200-1 thus transferring the context to other gNBs in advance, when the condition of the radio connection with the gNB connected to the IAB node 300-1 deteriorates, reconnection with the other gNB can be established immediately. FIG. 7 is a diagram illustrating an example of a table for determining the context transfer destination. Such a table is configured in advance for each gNB by, for example, an operator. As illustrated in FIG. 7, in the table, each IAB node is associated with candidates of the donor gNB for the IAB node. Specifically, each identifier related to the IAB node is associated with an identifier of a candidate of the donor gNB for the IAB node. For example, a gNB geographically close to an IAB node is configured to be a candidate of the donor gNB for that IAB node. Although an example of association with the gNB is described, association with cell IDs may be made. The cell ID may be a physical layer cell ID or a global cell ID. In addition, the gNB 200-1 may determine a gNB 200-1 geographically close to IAB node 300-1 as a donor candidate, based on the measurement report received from the IAB node 300-1. The gNB 200-1 may generate a table in which the IAB node 300-1 is associated with the candidate of the donor gNB for the IAB node 300-1 or update an existing such table, based on the determined donor candidate.

In step S109, the gNB 200-1 transmits a notification to the 5GC 10, indicating that the backhaul link connection with the IAB node 300-1 has been established. Alternatively, the gNB 200-1 may transmit a request to establish a PDU session for the IAB node to the 5GC 10. As described above, the PDU session establishment request may be transmitted from the AMF 11 to the gNB 200-1 before step S109 or in step S109.

(2) Example of Exceptional Operation Sequence

Figure 8:
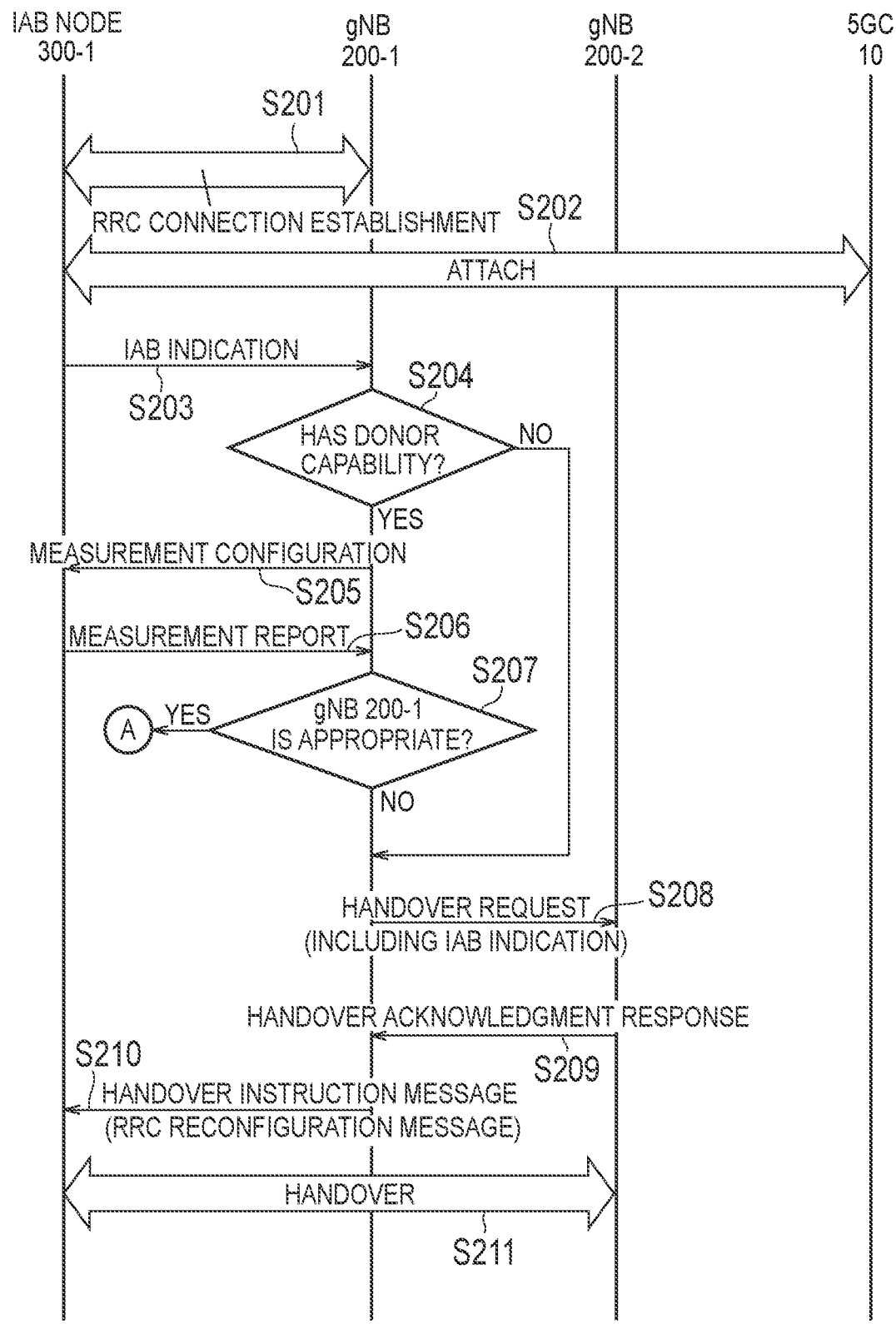
FIG. 8 is a diagram illustrating an example of an exceptional operation sequence according to the first embodiment.

FIG. 8 is a diagram illustrating an example of an exceptional operation sequence in the mobile communication system 1 according to this embodiment. In the exceptional operation sequence, the gNB 200-1 implements handover of the IAB node 300-1 to the gNB 200-2.

As illustrated in FIG. 8, in step S201, the IAB node 300-1 establishes an access link connection (RRC connection) with the gNB 200-1 by, for example, performing a random access procedure for the gNB 200-1. The IAB node 300-1 may provide the IAB indication in a message (e.g., Msg3) transmitted to the gNB 200-1 during the random access procedure. The gNB 200-1 acquires context information about the IAB node 300-1 in step S201.

In step S202, the IAB node 300-1 performs an attach procedure to the 5GC 10 (specifically, AMF 11) via the gNB 200-1.

In step S203, the IAB node 300-1 transmits the IAB indication to the gNB 200-1. The IAB node 300-1 transmits the RRC message including the IAB indication to the gNB 200-1, for example. Such an RRC message may be a "UE Capability Information" message indicating the capability of a UE. Note that if the IAB indication is transmitted in step S201, step S203 can be omitted.

In step S204, the gNB 200-1 determines whether it has the donor capability. If the gNB 200-1 does not have the donor capability (step S204: NO), gNB 200-1 advances the processing to step S208.

If the gNB 200-1 has the donor capability (step S204: YES), in step S205, the gNB 200-1 transmits the measurement configuration for configuring the radio measurement, to the IAB node 300-1. The IAB node 300-1 performs the radio measurement based on the measurement configuration. For example, the IAB node 300-1 measures the received power (received power of the cell-specific reference signal) for the cell of the current serving cell gNB 200-1 and the cell of the adjacent cell gNB 200-2.

In step S206, the IAB node 300-1 transmits a measurement report including the results of the radio measurement to the gNB 200-1.

In step S207, the gNB 200-1 determines whether it (gNB 200-1) is the appropriate donor gNB or another gNB is the appropriate donor gNB, based on the measurement report. Upon determining that it (gNB 200-1) is the appropriate donor gNB (step S207: YES), the gNB 200-1 advances the processing to step S106 in the above-mentioned normal operation sequence (see FIG. 6).

On the other hand, upon determining that another gNB is the appropriate donor gNB (step S207: NO), the gNB 200-1 advances the processing to step S208.

In step S208, the gNB 200-1 transfers the handover request message including the IAB indication received from the IAB node 300-1, to the gNB 200-2 over the Xn interface. The gNB 200-1 may provide the context information acquired in step S201, in the handover request message. Alternatively, the gNB 200-1 may transmit the handover request message including information indicating a request for the IAB node 300-1 to function as the donor gNB for the gNB, instead of including the IAB indication. In step S208, the gNB 200-1 may transfer the handover request message to the gNB 200-2 over the Xn interface, upon determining that the gNB 200-2 has the donor capability. Specifically, for example, when the gNB 200-1 determines that gNB 200-2 is associated with IAB node 300-1 as a donor candidate based on the table illustrated in FIG. 7, the gNB 200-1 may transfer the handover request message to the gNB 200-2. In this case, the gNB 200-2 is less likely to reject the handover request, whereby the IAB node 300-1 can be handed over more swiftly. Alternatively, information about own donor capability may be shared in advance between a plurality of gNB 200s adjacent to each other, via the Xn interface. Thus, the gNB 200-1 can identify the adjacent gNB 200 having the donor capability, and can transfer the handover request message to the adjacent gNB 200 thus identified.

The gNB 200-2 determines whether to accept the handover of the IAB node 300-1, while taking the IAB indication included in the handover request message into consideration. The gNB 200-2 may reject the handover request if it does not have the donor capability. Here, the description will be given under an assumption that the gNB 200-2 has determined to accept the handover of the IAB node 300-1.

In step S209, the gNB 200-2 transmits a handover acknowledgment response message to the gNB 200-1 over the Xn interface.

In step S210, the gNB 200-1 transmits a handover instruction message (RRC reconfiguration message) to the IAB node 300-1, based on the handover acknowledgment response message from the gNB 200-2. The handover instruction message includes information for designating the (cell) of the handover destination gNB 200-2.

In step S211, the IAB node 300-1 performs handover to the gNB 200-2 based on the handover instruction message from the gNB 200.

(3) Example of a Multi-Hop Connection Sequence

Figure 9:
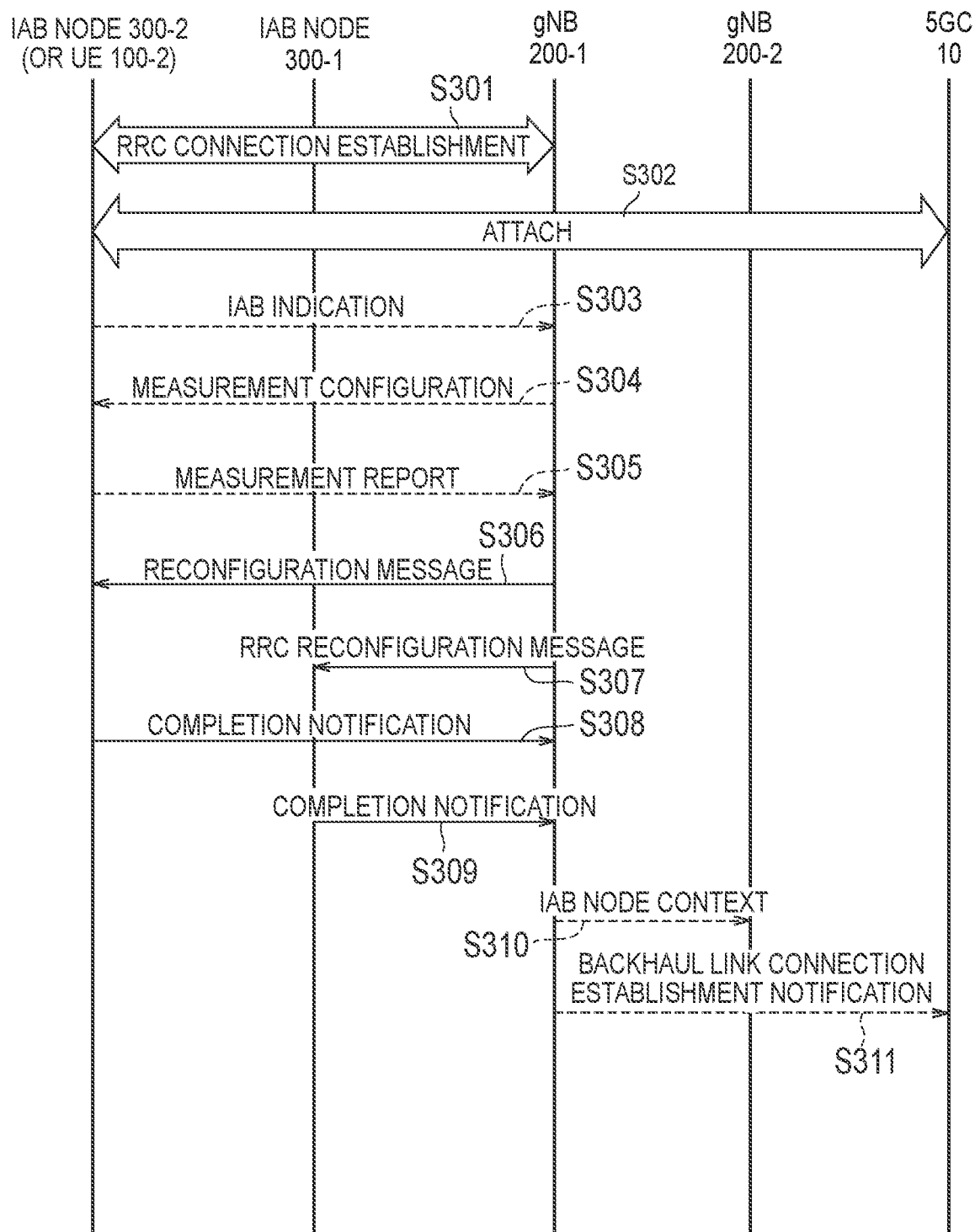
FIG. 9 is a diagram illustrating an example of a multi-hop connection sequence according to the first embodiment.

FIG. 9 is a diagram illustrating an example of a multi-hop connection sequence in the mobile communication system 1 according to this embodiment. The multi-hop connection sequence is a sequence for the IAB node 300-2 or the UE 100-2 to be connected to the IAB node 300-1 after the backhaul link connection has been connected between the IAB node 300-1 and gNB 200-1. Here, a case where the IAB node 300-2 is connected to the IAB node 300-1 will be mainly described, but the IAB node 300-2 may be replaced with the UE 100-2 as appropriate. Furthermore, the description that has already been made in the above-mentioned "(1) Normal operation sequence" will be omitted.

As illustrated in FIG. 9, in step S301, the IAB node 300-2 establishes an access link connection (RRC connection) with the gNB 200-1 by performing a random access procedure for the gNB 200-1 via the IAB node 300-1. The IAB node 300-2 may transmit a message (e.g., Msg3) including the IAB indication to the gNB 200-1 during the random access procedure. The gNB 200-1 acquires context information about the IAB node 300-2 in step S301.

In step S302, the IAB node 300-2 performs an attach procedure to the 5GC 10 (specifically, AMF 11) via the IAB node 300-2 and the gNB 200-1. Here, the IAB node 300-2 may notify the AMF 11 of a notification such as the IAB indication (that is, a notification indicating an intention to function as an IAB node). Thus, the IAB node 300-2 may acquire the list of candidate donor gNBs (cells), routing information indicating presence/absence of a lower node, other management information, and the like from the AMF 11. Alternatively, context information such as information indicating that the IAB node 300-2 is attached to each candidate donor gNB and routing information of the IAB node 300-2 may be notified from the AMF 11. If the IAB node 300-2 is already attached, the attach processing in step S302 can be omitted. Specifically, the attach processing by the IAB node 300-2 is omitted when the connection with the donor gNB needs to be reestablished due to a certain error, as in the RRC reestablishment.

In step S303, the IAB node 300-2 transmits the IAB indication to the gNB 200-1 via the IAB node 300-1. What triggers the transmission of the IAB indication by the IAB node 300-2 may be similar to that described in step S103 of "(1) Normal operation sequence" described above.

The IAB node 300-2 transmits the RRC message including the IAB indication to the gNB 200-1, for example. Such an RRC message may be a "UE Capability Information" message indicating the capability to function as a UE. Note that if the IAB indication is transmitted in step S301, step S303 can be omitted.

Alternatively, the AMF 11 may notify the gNB 200-1 of the IAB indication in a form of a change in the PDU session resource. The AMF may be an AMF for IAB management (dedicated).

Since the gNB 200-1 is assumed to have the donor capability in this operation sequence, the gNB 200-1 determines that the backhaul link connection needs to be established between the IAB node 300-1 and IAB node 300-2 based on the IAB indication.

In step S304, the gNB 200-1 transmits the measurement configuration for configuring the radio measurement, to the IAB node 300-2. The IAB node 300-2 performs the radio measurement based on the measurement configuration.

In step S305, the IAB node 300-2 transmits a measurement report including the results of the radio measurement to the gNB 200-1 via the IAB node 300-1. The gNB 200-1 determines whether it (gNB 200-1) is the appropriate donor gNB or another gNB is the appropriate donor gNB, based on the measurement report. Here, the description proceeds under an assumption that the gNB 200-1 has determined that it (gNB 200-1) is the appropriate donor gNB. The processing of steps S304 and S305 is not essential and may be omitted.

In step S306, the gNB 200-1 transmits an IAB node configuration message (RRC reconfiguration message) to the IAB node 300-2. The IAB node 300-2 executes processing of establishing a backhaul link connection with the IAB node 300-1 based on the IAB node configuration message. Such establishment processing includes processing of generating a protocol stack (adaptation/RLC/MAC/PHY entity) for the backhaul link and configuring parameters based on the configuration information in the IAB node configuration message. Such establishment processing may include processing of preparing a protocol stack on the UE side (for an access link) and starting transmission of a synchronization signal or a cell-specific reference signal (or processing of preparing for the start).

In step S307, the gNB 200-1 transmits an RRC reconfiguration message to the IAB node 300-1. Such an RRC reconfiguration message is a message for changing the configuration in the IAB node 300-1 due to the addition of the IAB node 300-2. Such an RRC reconfiguration message includes, for example, mapping information indicating association between a logical channel of the IAB node 300-2 and a logical channel of the backhaul link of the IAB node 300-1. Note that step S307 may be executed before step S306 or concurrently with step S306.

In step S308, the IAB node 300-2 transmits a completion notification message to the gNB 200-1. The message indicates that the IAB node configuration, including the establishment of the backhaul link connection with the IAB 300-1, has been completed. After step S308, the IAB node 300-2 functions as an IAB node instead of functioning as a UE, for the gNB 200-1.

In step S309, the IAB node 300-1 transmits a completion notification message to the gNB 200-1. The message indicates that the configuration change due to the establishment of the backhaul link connection with the IAB 300-2, has been completed. Note that step S309 may be executed before step S308 or concurrently with step S308.

In step S310, the gNB 200-1 transfers the context information on the IAB node 300-2 acquired in step S301 to the gNB 200-2 over the Xn interface.

In step S311, the gNB 200-1 transmits a notification to the 5GC 10, indicating that the backhaul link connection with the IAB node 300-2 has been established. Alternatively, the gNB 200-1 may transmit a request to establish a PDU session for the IAB node 300-2 to the 5GC 10. As described above, the PDU session establishment request may be transmitted from the AMF 11 to the gNB 200-1 before step S311 or in step S311.

Variation of the First Embodiment

In the example described in the above first embodiment, the IAB node 300-1 is handed over to the gNB 200-1 due to the gNB 200-1 not having the donor capability after the IAB node 300-1 has established a radio connection with the gNB 200-1. In such an example, each gNB 200 may provide information indicating whether it has the donor capability to the IAB node 300-1. This enables the IAB node 300-1 to select the gNB 200 having the donor capability and establish the connection with such a gNB 200. For example, the gNB 200 having the donor capability broadcasts a system information block (SIB) including information indicating that it has the donor capability. The IAB node 300-1 selects the gNB 200 to be the connection destination, based on the SIB. When the gNB 200 has the donor capability and the received power from this gNB 200 does not fall below a threshold, the IAB node 300-1 may select this gNB 200 as the connection destination. Alternatively, when the gNB 200 does not have donor capability, the IAB node 300-1 may reselect, upon receiving the SIB transmitted from the gNB 200, another gNB 200. Then, when the SIB transmitted from the other gNB 200 indicates that the other gNB 200 has the donor capability, the IAB node 300-1 performs the random access procedure for the other gNB 200 regarded as the connection destination and may transmit the IAB indication.

Alternatively, each gNB 200, in addition to notifying by the SIB that the gNB 200 has the donor ability, or instead of notifying by the SIB that the gNB 200 has the donor ability, may notify by the SIB that the gNB 200 itself has the ability of handling the IAB node 300. For example, each gNB 200 may notify by the SIB that the gNB 200 itself has a function of performing handover of the IAB node 300 to another gNB (donor gNB).

In the first embodiment described above, an example of including the IAB indication in the message (for example, Msg3) sent by the IAB node 300 to the gNB 200 during the random access procedure is described. Here, Msg3 is, for example, an RRC Setup Request message. Further, the IAB node 300 may include the IAB indication in Establishment Cause, which is a field (information element) in Msg3.

Alternatively, the IAB node 300 may use the random access preamble (Msg1) sent to the gNB 200 during the random access procedure to notify the IAB indication. For example, in a case where the SIB gives notification of the Physical Random Access Channel (PRACH) resources for the IAB indication, the IAB node 300 may notify the IAB indication by transmitting the random access preamble using the PRACH resources selected from the notified PRACH resources for the IAB indication. Here, the PRACH resources may be time/frequency resources or a signal sequence (preamble sequence).

Alternatively, the IAB node 300 may notify the IAB indication at a timing other than the random access procedure. For example, the IAB indication may be included in RRC messages such as a UE Assistance Information message.

In the first embodiment described above, the example in which the gNB 200 transmits the measurement configurations for configuring the radio measurement to the IAB node 300 or the UE 100 and receives a measurement report including the result of the radio measurement, so that whether the gNB 200 itself is an appropriate donor or another gNB is an appropriate donor gNB is determined based on the measurement report is described. However, without limitation to the case where the measurement result is used at the time of such initial connection, the measurement report may be used for changing the network topology or changing the data transfer route.

Second Embodiment

A second embodiment will be described while mainly focusing on differences from the above-mentioned first embodiment. The second embodiment is an embodiment that focuses on an Automatic Repeat reQuest (ARQ) in an RLC layer of an Acknowledged Mode (AM).

When the IAB node 300 intervenes in the communication between the UE 100 and the gNB (donor gNB) 200, there are two methods: one is to perform the ARQ by "end-to-end"; and the other is to perform the ARQ by "hop-by-hop". Note that data transfer on an uplink will be mainly described in this embodiment. However, the data transfer is not limited to such uplink data transfer, and may be downlink data transfer.

Figure 10:
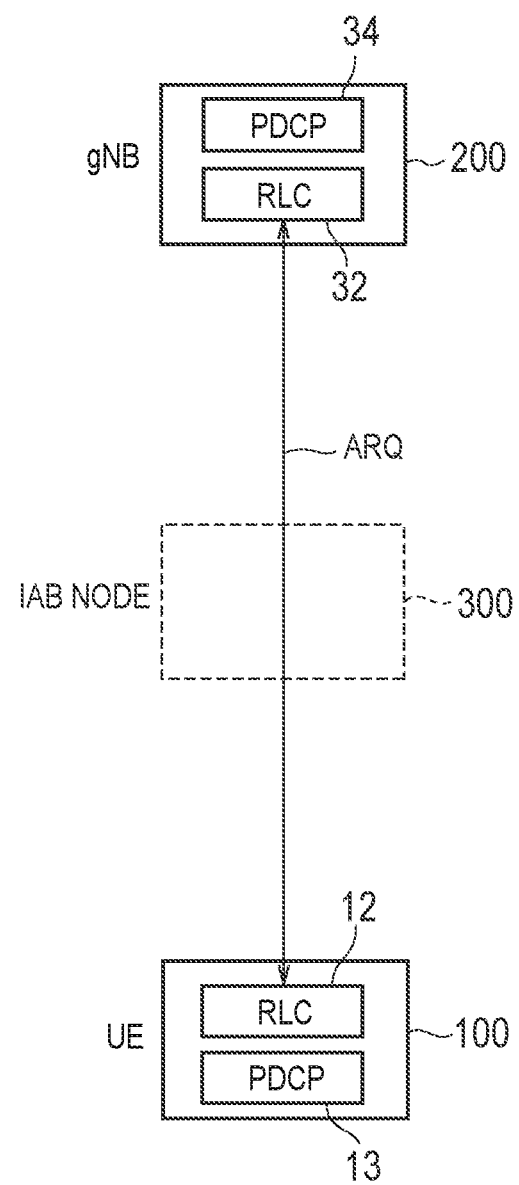
FIG. 10 is a diagram illustrating an example of "end-to-end" according to a second embodiment.

FIG. 10 is a diagram illustrating an example of "end-to-end".

As illustrated in FIG. 10, when the ARQ is performed by "end-to-end", a transmission side RLC entity 12 of the UE 100 transmits uplink data to a reception side RLC entity 32 of the gNB 200 via the IAB node 300, and holds this uplink data. When this uplink data is lost during transmission, the reception side RLC entity 32 of the gNB 200 transmits a negative acknowledgement (NACK), which indicates that the uplink data has failed to be received, to the transmission side RLC entity 12 of the UE 100 via the IAB node 300. The transmission side RLC entity 12 of the UE 100 retransmits the held uplink data in response to the reception of the NACK.

On the other hand, when the reception side RLC entity 32 of the gNB 200 succeeds in receiving the uplink data, the reception side RLC entity 32 of the gNB 200 transmits a positive acknowledgement (ACK), which indicates that the uplink data is successfully received, to the transmission side RLC entity 12 of the UE 100 via the IAB node 300. However, the reception side RLC entity 32 of the gNB 200 may transmit the ACK in response to a request (Status PDU) from the transmission side RLC entity 12 of the UE 100. Specifically, since it is made possible to collectively send such Acks of which amount is equivalent to a plurality of the PDUs, each of the Acks is not always returned immediately after such a successful reception. In response to the reception of the ACK, the transmission side RLC entity 12 of the UE 100 discards the held uplink data, and notifies the PDCP entity 13 of the UE 100 that the data is successfully transmitted. Note that the ACK may be returned each time when one PDU is successfully received.

Note that the data to be transmitted by the RLC entity is called "RLC data Protocol Data Unit (PDU)", and the data to be transmitted by the RLC entity of the AM is particularly called "AM Data (AMD) PDU". Moreover, a transmission side of the AMD PDU is called "transmitting AM RLC entity", and a reception side of the AMD PDU is called "receiving AM RLC entity". The ACK and the NACK are included in a PDU called "STATUS PDU". "STATUS PDU" is a type of "RLC control PDU".

In this way, even when the IAB node 300 intervenes in the communication between the UE 100 and the gNB 200, the ARQ is performed by "end-to-end", whereby the data lost on the data transfer path can be guaranteed to be transmitted to the reception side by being retransmitted.

On the other hand, when the ARQ is performed by "hop-by-hop" instead of "end-to-end", if the data is lost on the data transfer path, the lost data may not be retransmitted.

Figure 11:
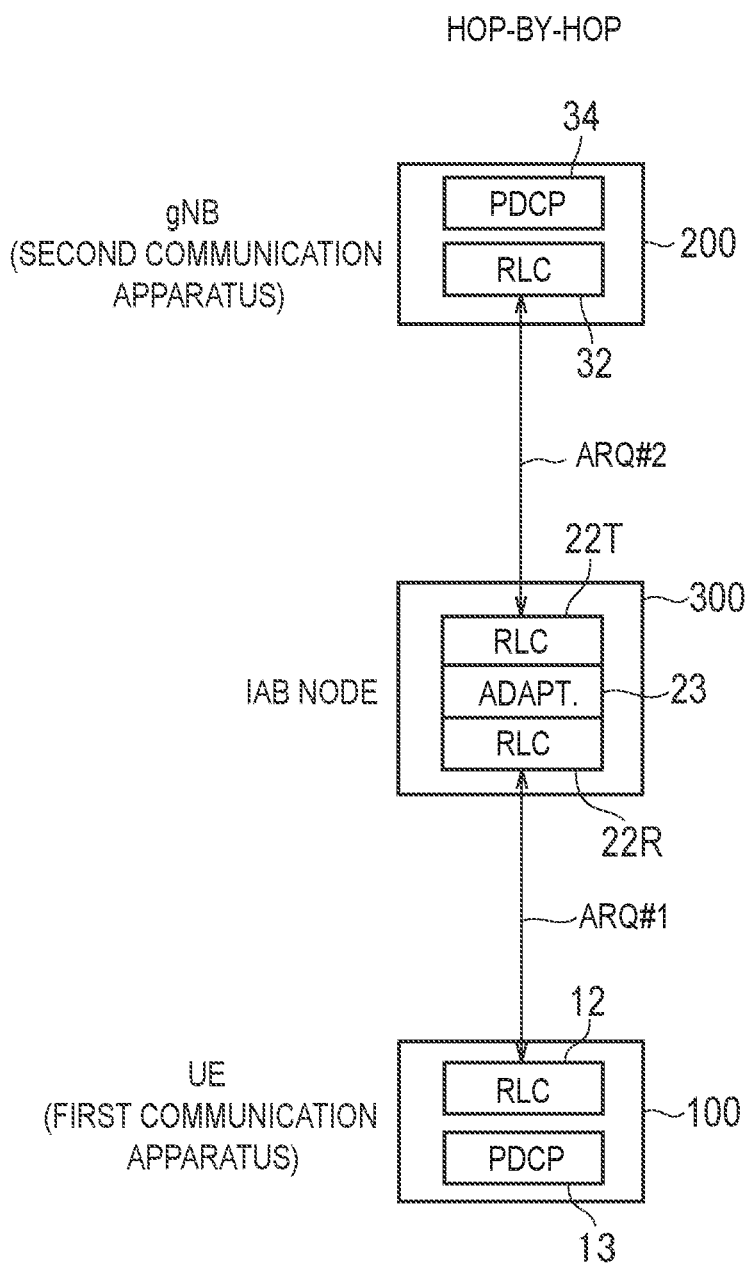
FIG. 11 is a diagram illustrating an example of "hop-by-hop" according to the second embodiment.

FIG. 11 is a diagram illustrating an example of "hop-by-hop".

As illustrated in FIG. 11, an ARQ #1 between the UE 100 and the IAB node 300 and an ARQ #2 between the IAB node 300 and the gNB 200 are performed individually. First, when the transmission side RLC entity 12 of the UE 100 transmits uplink data to a reception side RLC entity 22R of the IAB node 300, and the reception side RLC entity 22R of the IAB node 300 transmits an ACK to the transmission side RLC entity 12 of the UE 100, the transmission side RLC entity 12 of the UE 100 determines that the uplink data is successfully transmitted. The PDCP entity 13 of the UE 100 excludes (may discard) the uplink data, which is determined by the transmission side RLC entity 12 to be successfully transmitted, from such a retransmission target in a PDCP Data Recovery process.

Next, if the uplink data is lost when a transmission side RLC entity 22T of the IAB node 300 transmits the uplink data to the reception side RLC entity 32 of the gNB 200, the reception side RLC entity 32 of the gNB 200 transmits a NACK to a transmission side RLC entity 22T of the IAB node 300, and the transmission side RLC entity 22T of the IAB node 300 retransmits the uplink data. If the data cannot be recovered in the ARQ #2 between the IAB node 300 and the gNB 200, a PDCP entity 34 in the gNB 200 uses PDCP Data Recovery that is a retransmission mechanism of a PDCP layer, and requests the PDCP entity 13 of the UE 100 to retransmit the data. However, since the PDCP entity 13 of the UE 100 determines that the data is successfully transmitted to the IAB node 300, such retransmission in the PDCP layer may not be performed.

In order to solve such a problem in "hop-by-hop", the IAB node 300 according to this embodiment performs the following operations. As illustrated in FIG. 11, the IAB node 300 includes: the reception side RLC entity 22R that receives uplink data from a first communication apparatus; and the transmission side RLC entity 22T that transmits, to a second communication apparatus, the uplink data received by the reception side RLC entity 22R. In the example of FIG. 11, though the first communication apparatus is the UE 100, the first communication apparatus may be another IAB node that intervenes between the UE 100 and the IAB node 300. Moreover, in the example of FIG. 11, though the second communication apparatus is the gNB 200, the second communication apparatus may be another IAB node that intervenes between the gNB 200 and the IAB node 300.

The transmission side RLC entity 22T receives, from the second communication apparatus, a first positive acknowledgement (ACK) indicating that the second communication apparatus has successfully received the transmitted uplink data. In response to the fact that the transmission side RLC entity 22T has received the first positive acknowledgement (ACK), the reception side RLC entity 22R transmits, to the first communication apparatus, a second positive acknowledgement (ACK) indicating that the reception side RLC entity 22R has successfully received the uplink data. That is, the reception side RLC entity 22R does not transmit the second positive acknowledgement (ACK) to the first communication apparatus until the transmission side RLC entity 22T receives the first positive acknowledgement (ACK).

In this way, in the IAB node 300, the reception side RLC entity 22R does not transmit such an ACK, which corresponds to the uplink data, to the first communication apparatus until the transmission side RLC entity 22T confirms that the uplink data has been successfully transmitted. Thus, the first communication apparatus holds the uplink data until receiving, from the reception side RLC entity 22R, the ACK corresponding to the uplink data, and accordingly, can solve such a problem in "hop-by-hop" as mentioned above.

The IAB node 300 may have an entity 23 in an adaptation layer (Adapt.) positioned in an upper layer than the reception side RLC entity 22R and the transmission side RLC entity 22T. Hereinafter, the entity in the adaptation layer will be referred to as an "adaptation entity". When a plurality of the receiving RLC entities 22R and a plurality of the transmitting RLC entities 22T exist, the adaptation entity 23 manages mapping information indicating associations between the receiving RLC entities 22R and the transmitting RLC entities 22T. The adaptation entity 23 may manage the mapping information for each logical channel (LCH), or may manage the mapping information for each identifier (for example, Cell-Radio Network Temporary Identifier (C-RNTI) or the like) of the UE 100.

The adaptation entity 23 acquires information regarding the first positive acknowledgement (ACK) from the transmission side RLC entity 22T, and provides the acquired information to the reception side RLC entity 22R. Based on the information provided from the adaptation entity 23, the reception side RLC entity 22R confirms that the transmission side RLC entity 22T has received the first positive acknowledgement (ACK).

For example, the transmission side RLC entity 22T notifies the adaptation entity 23 of a STATUS PDU (ACK/NACK) as delivery information from the reception side RLC entity 32 of the second communication apparatus. Alternatively, the transmission side RLC entity 22T may notify the adaptation entity 23 of ACK/NACK information as delivery information, the ACK/NACK information being based on the STATUS PDU. The ACK/NACK information may include a sequence number (SN) that succeeded in delivery or a sequence number (SN) that has failed to be delivered. The adaptation entity 23 transfers the delivery information, which is from the transmission side RLC entity 22T, to the reception side RLC entity 22R corresponding thereto. The reception side RLC entity 22R acquires the delivery information transferred from the adaptation entity 23, and determines that the ACK becomes transmittable for an RLC PDU (AMD PDU) in the case of having been able to confirm that the RLC PDU (AMD PDU) has been successfully transmitted. In this embodiment, though an example is assumed in which the IAB node 300 has an independent adaptation entity 23, the IAB node 300 does not have to have such an independent adaptation entity 23. A functionality of the adaptation entity 23 may be integrated into an entity in another layer (for example, RLC, MAC). In such a case, the delivery information may be directly passed between the reception side RLC entity 22R and the transmission side RLC entity 22T, or the delivery information may be passed via an RRC entity.

In this embodiment, the reception side RLC entity 22R may count a waiting time from receiving the uplink data from the first communication apparatus until the transmission side RLC entity 22T receives the first positive acknowledgement (ACK) (or until the reception side RLC entity 22R acquires the delivery information from the transmission side RLC entity 22T or determines that it is made possible to transmit the ACK for the RLC PDU (AMD PDU). When the waiting time exceeds a certain period of time, the reception side RLC entity 22R may transmit, to the first communication apparatus, a negative acknowledgement (NACK) indicating that the reception side RLC entity 22R has failed to receive the uplink data. When the reception side RLC entity 22R has received the uplink data retransmitted from the first communication apparatus in response to such a negative acknowledgement (NACK), the transmission side RLC entity 22T may attempt the retransmission to the second communication apparatus according to the received uplink data. Alternatively, when the waiting time exceeds a certain period of time, the reception side RLC entity 22R may transmit a message requesting the PDCP entity 13 of the UE 100 to trigger the PDCP Data Recovery. An upper layer (for example, the adaptation entity 23 or the RRC entity) may be notified of such a message from the reception side RLC entity 22R, and the message may be transmitted from the upper layer to the UE 100.

For example, the reception side RLC entity 22R activates a timer upon receiving the uplink data (RLC PDU) from the first communication apparatus. A certain period of time is set in the timer, and when the certain period of time elapses (that is, the timer expires), the reception side RLC entity 22R transmits the negative acknowledgement (NACK) to the first communication apparatus. The reception side RLC entity 22R stops the timer when the transmission side RLC entity 22T receives the first positive acknowledgement (ACK) from the second communication apparatus (or the reception side RLC entity 22R acquires the delivery information from the transmission side RLC entity 22T or determines that it is made possible to transmit the ACK for the RLC PDU (AMD PDU)). Note that the certain period of time set in the timer may be specified from the gNB 200 by, for example, RRC signaling, or may be stored in advance in the IAB node 300. Moreover, the certain period of time set in the timer may be transferred from another IAB node 300. According to the setting from the gNB 200, the reception side RLC entity 22R may change an operation when the timer expires. For example, the reception side RLC entity 22R may be configured to transmit the second positive acknowledgement (ACK) to the first communication apparatus when the timer expires. In this embodiment, the transmission side RLC entity 12 of the UE 100 (first communication apparatus) preferably sets the timer, which defines a maximum waiting time of the ACK (or a maximum waiting time of the STATUS PDU), longer than usual so as not to determine that the transmission has failed even if the waiting time of the ACK becomes long. For example, by the RRC signaling, the gNB 200 may set a timer value longer than usual to the transmission side RLC entity 12 of the UE 100 (first communication apparatus). The transmission side RLC entity 12 of the UE 100 is configured not to, while the timer is running, request the reception side RLC entity 22R of the IAB node 300 to transmit the STATUS PDU.

Figure 12:
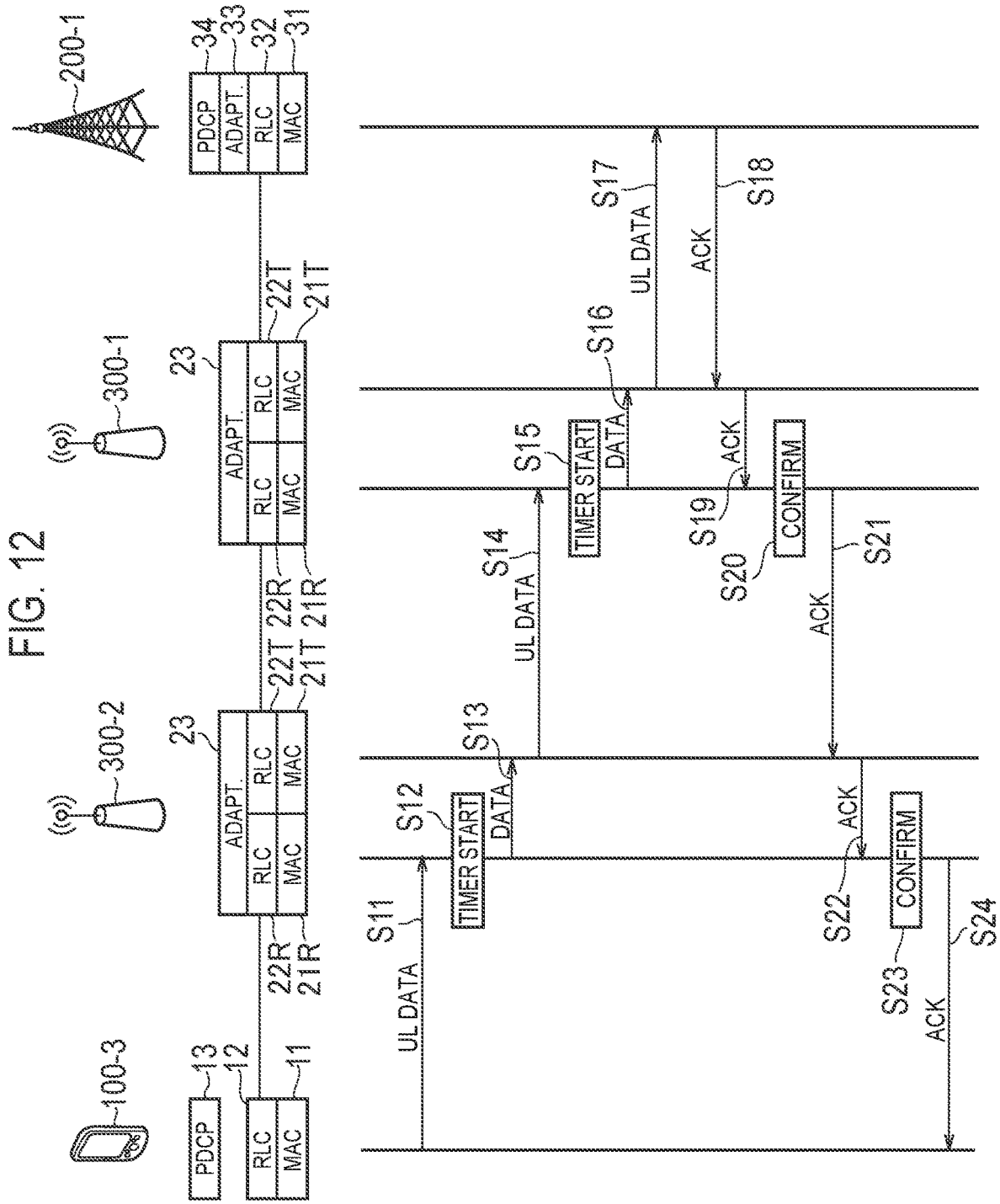
FIG. 12 is a sequence diagram illustrating an operation example according to the second embodiment.

FIG. 12 is a sequence diagram illustrating an operation example according to this embodiment.

Here, it is assumed that the uplink data is transferred between the UE 100-3 and the gNB 200-1, which are illustrated in FIG. 1. In this operation example, the second communication apparatus is the IAB node 300-1 that intervenes in the communication between the IAB node 300-2 and the gNB 200-1 (donor gNB).

As illustrated in FIG. 12, in step S11, the transmission side RLC entity 12 of the UE 100-3 receives, as an RLC Service Data Unit (SDU), the PDCP PDU from the PDCP entity 13, generates an RLC PDU from the RLC SDU, and transmits the generated RLC PDU to the IAB node 300-2 via a MAC entity 11. The reception side RLC entity 22R of the IAB node 300-2 receives the RLC PDU via a MAC entity 21R.

In step S12, the reception side RLC entity 22R of the IAB node 300-2 activates the timer in response to the reception of the RLC PDU, and thereby counts a waiting time until the transmission side RLC entity 22T of the IAB node 300-2 receives the ACK. Note that the timer may be provided for each RLC PDU, or may be provided for each group composed of a plurality of the RLC PDUs. That is, if the timer is provided for each group composed of a plurality of the RLC PDUs, then the reception side RLC entity 22R of the IAB node 300-2 may activate the timer in the case of having received the plurality of RLC PDUs. In that case, the reception side RLC entity 22R of the IAB node 300-2 may transmit the ACK to the UE 100-3 in step S24 to be described later in response to the case where the transmission side RLC entity 22T has received an ACK corresponding to the plurality of RLC PDUs in step S21 to be described later.

In step S13, the reception side RLC entity 22R of the IAB node 300-2 provides the RLC SDU to the transmission side RLC entity 22T of the IAB node 300-2 via the adaptation entity 23 of the IAB node 300-2.

In step S14, the transmission side RLC entity 22T of the IAB node 300-2 generates an RLC PDU from the RLC SDU received from the adaptation entity 23, and transmits the generated RLC PDU to the IAB node 300-1 via the MAC entity 21. The reception side RLC entity 22R of the IAB node 300-1 receives the RLC PDU via the MAC entity 21R.

In step S15, the reception side RLC entity 22R of the IAB node 300-1 activates the timer in response to the reception of the RLC PDU, and thereby counts a waiting time until the transmission side RLC entity 22T of the IAB node 300-1 receives the ACK.

In step S16, the reception side RLC entity 22R of the IAB node 300-1 provides the RLC SDU to the transmission side RLC entity 22T of the IAB node 300-1 via the adaptation entity 23 of the IAB node 300-1.

In step S17, the transmission side RLC entity 22T of the IAB node 300-1 generates an RLC PDU from the RLC SDU received from the adaptation entity 23, and transmits the generated RLC PDU to the gNB 200-1 via the MAC entity 21. The reception side RLC entity 32 of the gNB 200-1 receives the RLC PDU via the MAC entity 31. The reception side RLC entity 32 of the gNB 200-1 provides an RLC SDU, which corresponds to the received RLC PDU, to the PDCP entity 34 via the adaptation entity 33.

In step S18, the reception side RLC entity 32 of the gNB 200-1 transmits a STATUS PDU, which includes an ACK corresponding to the RLC PDU received in step S17, to the IAB node 300-1 via the MAC entity 31. This STATUS PDU may also include ACK/NACK corresponding to another RLC PDU. The transmission side RLC entity 22T of the IAB node 300-1 receives the STATUS PDU via the MAC entity 21T.

In step S19, the transmission side RLC entity 22T of the IAB node 300-1 provides the received STATUS PDU or delivery information based on the same to the reception side RLC entity 22R of the IAB node 300-1 via the adaptation entity 23 of the IAB node 300-1.

In step S20, based on the delivery information, the reception side RLC entity 22R of the IAB node 300-1 confirms that the transmission side RLC entity 22T of the IAB node 300-1 has received the ACK corresponding to the RLC PDU received in step S14.

In step S21, the reception side RLC entity 22R of the IAB node 300-1 transmits a STATUS PDU, which includes the ACK corresponding to the RLC PDU received in step S14, to the IAB node 300-2 via the MAC entity 21R. The transmission side RLC entity 22T of the IAB node 300-2 receives the STATUS PDU via the MAC entity 21T.

In step S22, the transmission side RLC entity 22T of the IAB node 300-2 provides delivery information, which is based on the received STATUS PDU, to the reception side RLC entity 22R of the IAB node 300-2 via the adaptation entity 23 of the IAB node 300-2.

In step S23, based on the delivery information, the reception side RLC entity 22R of the IAB node 300-2 confirms that the transmission side RLC entity 22T of the IAB node 300-2 has received the ACK corresponding to the RLC PDU received in step S11.

In step S24, the reception side RLC entity 22R of the IAB node 300-2 transmits a STATUS PDU, which includes the ACK corresponding to the RLC PDU received in step S11, to the UE 100-3 via the MAC entity 21R. The transmission side RLC entity 12 of the UE 100-3 receives the STATUS PDU via the MAC entity 11, confirms the successful transmission of the RLC PDU transmitted in step S11, and notifies the PDCP entity 13 of that effect.

Moreover, while in the above-mentioned embodiment, the description has been mainly given of the case where the gNB 200-1 or each IAB node normally receives the RLC PDU and transmits the STATUS PDU including the ACK, a description will be given below of a case where the gNB 200-1 or each IAB node does not normally receive the RLC PDU.

The gNB 200-1 or the reception side RLC entity of each IAB node 300-1 transmits a STATUS PDU, which includes a NACK, to the transmission side RLC entity of each IAB node 300-1 (300-2). In that case, the transmission side RLC entity 22T of each IAB node 300-1 (300-2) retransmits the RLC PDU in response to the reception of the STATUS PDU. Thereafter, in the case of having received the STATUS PDU including the ACK, then as in the above-mentioned embodiment, the transmission side RLC entity 22T of each IAB node 300-1 (300-2) provides delivery information, which is based on the received STATUS PDU, to the reception side RLC entity 22R of the IAB node 300-1 (300-2) via the adaptation entity 23 of each IAB node 300-1 (300-2).

Moreover, the transmission side RLC entity 22T of the IAB node 300-1 (300-2) may transmit the STATUS PDU, which includes the NACK, to the IAB node 300-2 or the UE 100-3 in the case of being unable to retransmit the RLC PDU, in the case of having received the STATUS PDU, which includes the NACK, a predetermined number of times, or in the case where the timer expires.

Note that the IAB node 300-1 (300-2) may stop the timer at the same time as transmitting the STATUS PDU, which includes the NACK, to the IAB node 300-2 or the UE 100-3.

Figure 13:
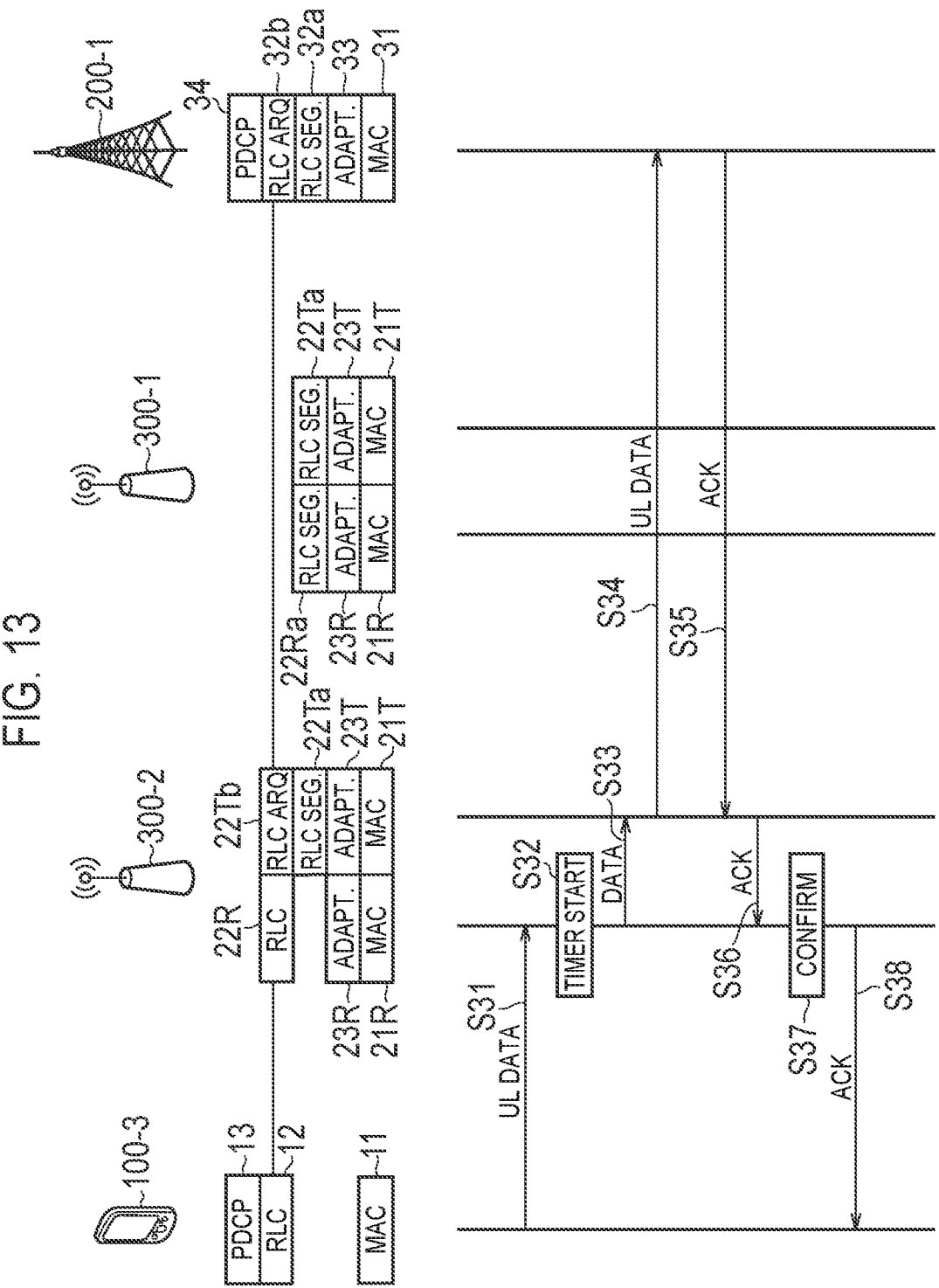
FIG. 13 is a sequence diagram illustrating another operation example according to the second embodiment.

FIG. 13 is a sequence diagram illustrating another operation example according to this embodiment. Here, differences from the operation example of FIG. 12 will be described.

As illustrated in FIG. 13, in this operation example, the adaptation entity 23 is positioned in a lower layer than the RLC entity 22. In such a configuration, for example, the adaptation entity 23 performs QoS control, distinguishes between UL reception from the UE 100 and UL reception from the IAB node and associates both thereof with each other, and gives an instruction to the MAC. Moreover, in the IAB nodes 300-1 and 300-2 and the gNB 200-1, the RLC entity 22 is divided into an ARQ function (RLC ARQ) and a data division/combination function (RLC Seg.).

As illustrated in FIG. 13, in step S31, the transmission side RLC entity 12 of the UE 100-3 receives, as an RLC SDU, the PDCP PDU from the PDCP entity 13, generates an RLC PDU from the RLC SDU, and transmits the generated RLC PDU to the IAB node 300-2 via the MAC entity 11. The reception side RLC entity 22R of the IAB node 300-2 receives the RLC PDU via the MAC entity 21R and an adaptation entity 23R.

In step S32, the reception side RLC entity 22R of the IAB node 300-2 activates the timer in response to the reception of the RLC PDU, and thereby counts a waiting time until a transmission side RLC entity (RLC ARQ) 22Tb of the IAB node 300-2 receives the ACK.

In step S33, the reception side RLC entity 22R of the IAB node 300-2 relays an RLC SDU, which corresponds to the RLC PDU received in step S32, to the transmission side RLC entity (RLC ARQ) 22Tb.

In step S34, the transmission side RLC entity (RLC ARQ) 22Tb of the IAB node 300-2 transmits the RLC SDU, which is received from the reception side RLC entity 22R, to the IAB node 300-1 via a transmission side RLC entity (RLC Seg.) 22Ta, an adaptation entity 23T and the MAC entity 21T. Here, the transmission side RLC entity (RLC Seg.) 22Ta assigns a sequence number to the RLC SDU and divides (segments) the same. A reception side RLC entity (RLC Seg.) 22Ra of the IAB node 300-1 receives the RLC PDU via the MAC entity 21R and the adaptation entity 23R, and relays the RLC PDU to the transmission side RLC entity (RLC Seg.) 22Ta. The transmission side RLC entity (RLC Seg.) 22Ta of the IAB node 300-1 divides the relayed RLC SDU (PDCP PDU), and transmits the divided RLC SDU (PDCP PDU) to the gNB 200-1 via the adaptation entity 23T and the MAC entity 21T. Note that, from an ARQ point of view, the IAB node 300-1 is transparent. A reception side RLC entity (RLC ARQ) 32b of the gNB 200-1 receives the RLC PDU via the MAC entity 31, the adaptation entity 33, and a reception side RLC entity (RLC Seg.) 32a. The reception side RLC entity (RLC ARQ) 32b of the gNB 200-1 provides an RLC SDU, which corresponds to the received RLC PDU, to the PDCP entity 34.

In step S35, the reception side RLC entity (RLC ARQ) 32b of the gNB 200-1 receives a STATUS PDU, which includes the ACK corresponding to the RLC PDU received in step S34, to the IAB node 300-1 via a reception side RLC entity (RLC Seg.) 32a, the adaptation entity 33, and the MAC entity 31. This STATUS PDU may include a NACK corresponding to another RLC PDU. The STATUS PDU is transmitted to the IAB node 300-2 via the IAB node 300-1. The transmission side RLC entity (RLC ARQ) 22Tb of the IAB node 300-2 receives the STATUS PDU via the MAC entity 21T, the adaptation entity 23T, and the transmission side RLC entity (RLC Seg.) 22Ta.

In step S36, the transmission side RLC entity (RLC ARQ) 22Tb of the IAB node 300-2 provides the received STATUS PDU or delivery information based on the same to the reception side RLC entity 22R of the IAB node 300-2.

In step S37, based on the delivery information, the reception side RLC entity 22R of the IAB node 300-2 confirms that the transmission side RLC entity (RLC ARQ) 22Tb of the IAB node 300-2 has received the ACK corresponding to the RLC PDU received in step S31.

In step S38, the reception side RLC entity 22R of the IAB node 300-2 transmits a STATUS PDU, which includes the ACK corresponding to the RLC PDU received in step S31, to the UE 100-3 via the adaptation entity 23R and the MAC entity 21R. The transmission side RLC entity 12 of the UE 100-3 receives the STATUS PDU via the MAC entity 11, confirms the successful transmission of the RLC PDU transmitted in step S31, and notifies the PDCP entity 13 of that effect.

Note that, in the operation example illustrated in FIG. 13, the gNB 200-1 may refer to, for example, a routing table, identify the IAB node 300-2 that provides an access link to the UE 100-3, and transmit another ACK/NACK than the normal ACK/NACK (STATUS PDU) to the IAB node 300-2. Here, such another ACK/NACK may be one that collectively transmits ACKs/NACKs of a plurality of (backhaul) bearers in one message. In that case, ID for identifying the bearer (or RLC channels) and ACK/NACK information may be linked (listed) with each other and transmitted. The gNB 200-1 may transmit such another ACK/NACK in response to a request from the IAB node 300-2.

As described above, according to this embodiment, even if data is lost on the data transfer path when the ARQ is performed by "hop-by-hop", it is possible to perform the retransmission in the PDCP layer. Since matching is established with a current PDCP operation, there is no need to make any changes to the current PDCP operation. Specifically, backward compatibility can be maintained by minimizing changes in the operation of the UE 100. Moreover, since each IAB node 300 only needs to take account of an ACK reception status of such a relay destination, an increase in complexity and processing can be prevented.

Modified Example of Second Embodiment

A modified example of the second embodiment will be described while mainly focusing on differences from the above-mentioned second embodiment. This modified example may be carried out in combination with the above-mentioned second embodiment, or may be carried out separately from the above-mentioned second embodiment.

In this modified example, data transfer on the uplink will be mainly described. However, the data transfer is not limited to such uplink data transfer, and may be downlink data transfer.

When relaying data from a first communication apparatus to a second communication apparatus, an IAB node 300 according to this modified example holds the data. The first communication apparatus may be the UE 100, or may be another IAB node that intervenes between the UE 100 and the IAB node 300. The second communication apparatus may be the gNB 200, or may be another IAB node that intervenes between the gNB 200 and the IAB node 300. The IAB node 300 transmits the held data to a third communication apparatus in response to a deterioration of a radio condition in a radio link to the second communication apparatus or switching of the data transfer path.

Figure 14:
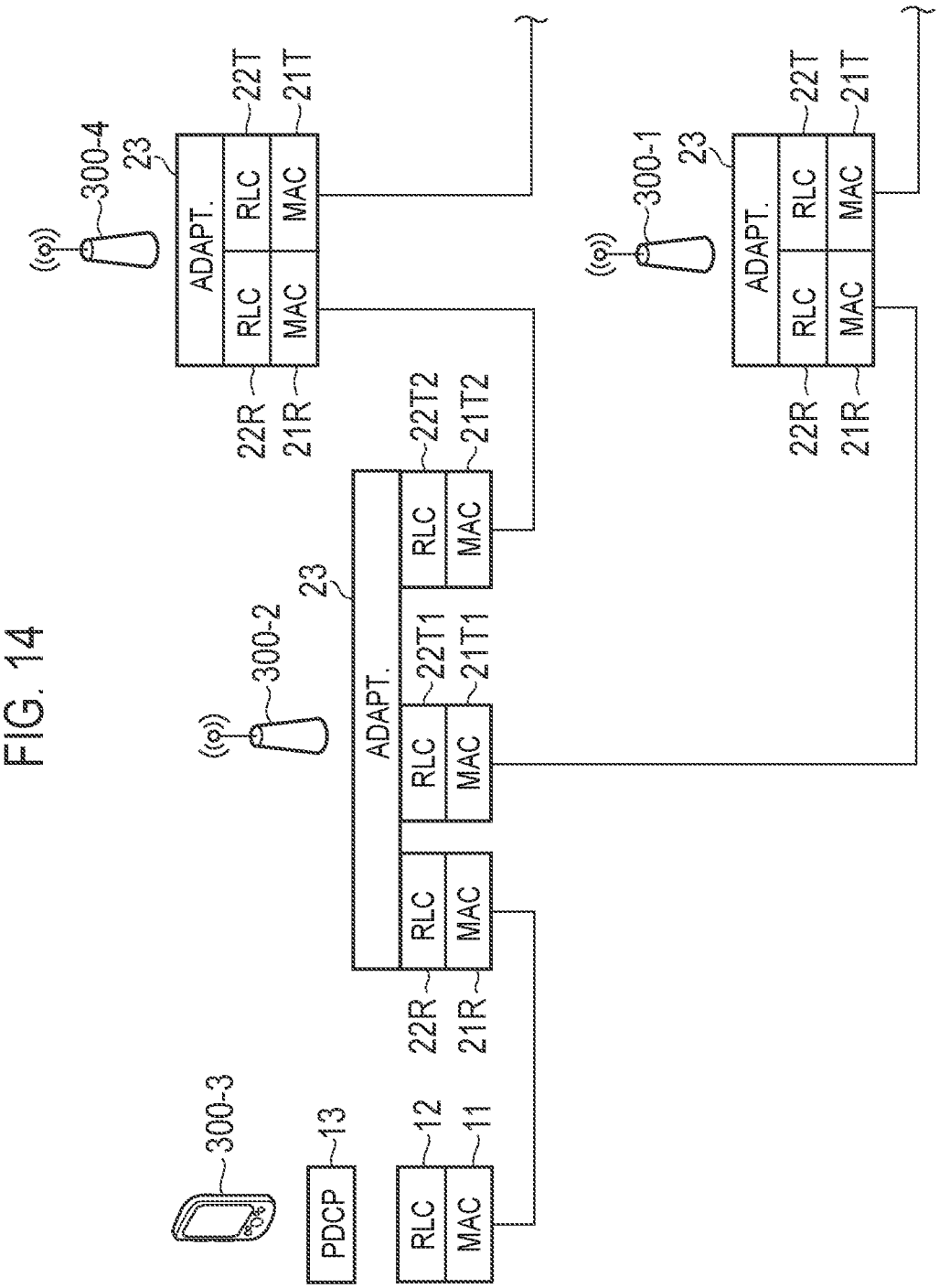
FIG. 14 is a diagram illustrating a modified example of the second embodiment.
Figure 15:
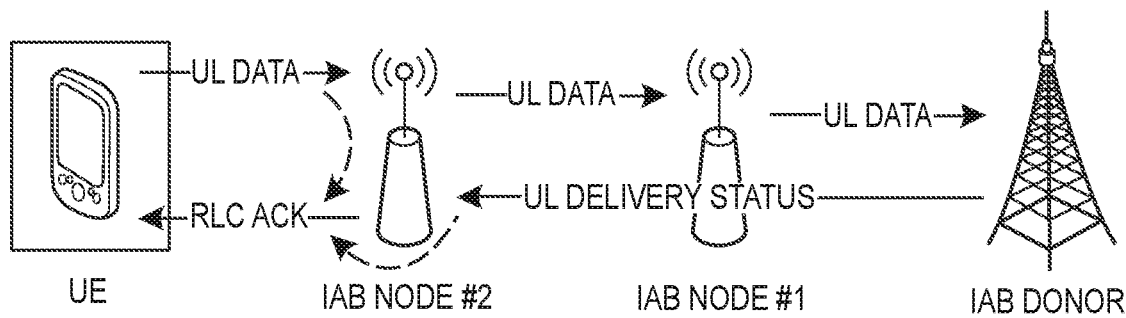
FIG. 15 is a diagram illustrating Option 1 for delaying transmission of an RLC ACK to a UE.
Figure 16:
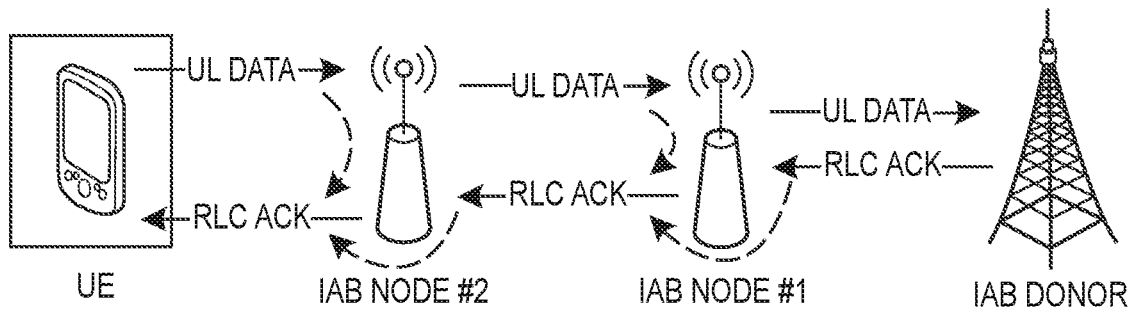
FIG. 16 is a diagram illustrating Option 2 for delaying the transmission of the RLC ACK to the UE.

FIG. 14 is a diagram illustrating a configuration example according to this modified example.

As illustrated in FIG. 14, the IAB node 300-2 includes: the reception side RLC entity 22R that receives data from the first communication apparatus; a first transmission side RLC entity $22T_1$ associated with the second communication apparatus; and a second transmission side RLC entity $22T_2$ associated with the third communication apparatus. In an example of FIG. 14, the first communication apparatus is the UE 100-3, the second communication apparatus is the IAB node 300-1, and the third communication apparatus is an IAB node 300-4.

The IAB node 300-2 includes the adaptation entity 23 that provides data, which is received by the reception side RLC entity 22R, to the first transmission side RLC entity $22T_1$ and holds (buffers) the data. The adaptation entity 23 is positioned in an upper layer than the RLC entity 22.

The adaptation entity 23 of the IAB node 300-2 provides the held data to the second transmission side RLC entity $22T_2$ in response to a deterioration of a radio condition between the IAB node 300-2 and the second communication apparatus (IAB node 300-1) or switching of the data transfer path from the second communication apparatus (IAB node 300-1) to the third communication apparatus (IAB node 300-4). Here, the deterioration of the radio condition may mean that a radio link failure has occurred with the second communication apparatus, that a radio signal from the second communication apparatus has been interrupted, or that a reception level of the radio signal from the second communication apparatus has fallen below a threshold. Moreover, the switching of the data transfer path may be a change of network topology by handover.

For example, the adaptation entity 23 buffers the PDCP PDU (RLC SDU) that has already been passed to the one transmission side RLC entity $22T_1$, and when a failure occurs in a radio link linked with this transmission side RLC entity $22T_1$, the adaptation entity 23 passes the buffered PDCP PDU to the transmission side RLC entity $22T_2$ linked with another radio link. Thus, data can be prevented from being lost even when the radio link failure occurs.

Specifically, the adaptation entity 23 of the IAB node 300-2 acquires the RLC SDU from the reception side RLC entity 22R, makes a copy of the RLC SDU (PDCP PDU), stores one RLC SDU (PDCP PDU) in a buffer of itself, and passes the other RLC SDU (PDCP PDU) to the first transmission side RLC entity $22T_1$. Then, when a radio link error occurs, the adaptation entity 23 of the IAB node 300-2 takes out the stored RLC SDU (PDCP PDU) from the buffer, and passes the stored RLC SDU (PDCP PDU) to the second transmission side RLC entity $22T_2$ in which no radio link error occurs. Here, the radio link error may be notified from an RRC of the IAB node 300-2, or may be notified from an RRC of the gNB (donor gNB) 200. Alternatively, a copy of the RLC SDU may be passed from the reception side RLC entity 22R of the IAB node 300-2 to the second transmission side RLC entity $22T_2$. Moreover, a transmission side RLC entity of a switching destination may be specified from an RRC of the IAB node 300-2, or may be specified from the RRC of the gNB (donor gNB) 200.

The adaptation entity 23 of the IAB node 300-2 activates the timer when storing the RLC SDU (PDCP PDU), and discards the RLC SDU (PDCP PDU) when the timer expires. Alternatively, the adaptation entity 23 of the IAB node 300-2 may acquire delivery confirmation information (ACK/NACK) from the adaptation entity of the gNB (donor gNB) 200 or an adaptation entity of another IAB node, and when determining that the held RLC SDU (PDCP PDU) has been successfully transmitted, may discard the RLC SDU (PDCP PDU). Moreover, the adaptation entity 23 of the IAB node 300-2 may stop the timer when discarding the RLC SDU (PDCP PDU). Furthermore, instead of discarding the RLC SDU (PDCP PDU), the adaptation entity 23 of the IAB node 300-2 may exclude the RLC SDU (PDCP PDU) from the retransmission target using the PDCP Data Recovery.

Moreover, in response to the fact that the second transmission side RLC entity $22T_2$ has received the STATUS PDU (ACK/NACK) or the delivery confirmation information (ACK/NACK) from the reception side RLC entity 22R of another IAB node 300-4, and has acquired these pieces of information from the second transmission side RLC entity $22T_2$, the adaptation entity 23 of IAB node 300-2 may discard the RLC SDU (PDCP PDU) or may excluded the RLC SDU (PDCP PDU) from the retransmission target using the PDCP Data Recovery.

Note that, though a PHY entity of each apparatus (UE, IAB node, gNB) is omitted in FIGS. 12 to 14, each apparatus actually includes the PHY entity, and may communicate with others via each PHY entity.

Other Embodiments

An example in which the mobile communication system 1 is a 5G mobile communication system is mainly described in the above embodiment. Alternatively, the base station in the mobile communication system 1 may be an eNB. Furthermore, the core network in the mobile communication system 1 may be Evolved Packet Core (EPC). Furthermore, the gNB may be connected to the EPC, the eNB may be connected to the 5GC, and the gNB and the eNB may be connected to each other via an inter-base station interface (Xn interface, X2 interface).

A program for causing a computer to execute each processing described the above embodiment. In addition, the program may be recorded on a computer-readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing by the UE 100 and the gNB 200 and a processor that executes the program stored in the memory may be provided.

Note that the flows shown in each figure may be combined as appropriate.

APPENDIX

1. Introduction

RAN2 AH1807 extensively discussed the end-to-end reliability, i.e., comparing "end-to-end" and "hop-by-hop" RLC ARQ mechanisms, and agreed to capture the additional text in the TR.

Observations for "end-to-end" and "hop-by-hop" ARQ

TABLE 1

| Metric | Hop-by-hop RLC ARQ | End-to-end RLC ARQ |
|---|---|---|
| Lossless delivery of UL data during topology change (e.g. failure of radio link between IAB nodes) | Current specification cannot ensure data lossless delivery when IAB topology changes are performed without additional enhancements (examples listed below). | Lossless delivery ensured due to end to end RLC feedback. |

(e.g. failure of radio link between IAB nodes)

Current specification cannot ensure data lossless delivery when IAB topology changes are performed without additional enhancements (examples listed below).

Lossless delivery ensured due to end to end RLC feedback.

The issue of end to end reliability in hop-by-hop RLC ARQ case could be addressed by specifying, e.g., the following mechanisms.

Modification of PDCP protocol/procedures. This solution would not be applicable to Rel-15 UEs which means that Rel-15 UE performance may be impaired.

Rerouting of PDCP PDUs buffered on intermediate IAB-nodes in response to a route update (FFS what information needs to be exchanged between IAB nodes).

Introducing UL status delivery (from the Donor gNB to the IAB node), whereby the IAB node can delay the sending of RLC ACKs to the UE until a confirmation of reception at the Donor gNB.

In this appendix, further consideration of the hop-by-hop RLC ARQ mechanisms is discussed.

2. Discussion

The agreed TP identified the issue in the "hop-by-hop" RLC ARQ mechanism in terms of end-to-end reliability, i.e., "Lossless delivery of UL data during topology change", and it also capture the three possible approaches. As reference, the approaches are quoted below.

The first approach: "Modification of PDCP protocol/ procedures. This solution would not be applicable to Rel-15 UEs which means that Rel-15 UE performance may be impaired."

The second approach: "Rerouting of PDCP PDUs buffered on intermediate IAB-nodes in response to a route update (FFS what information needs to be exchanged between IAB nodes)."

The third approach: "Introducing UL status delivery (from the Donor gNB to the IAB node), whereby the IAB node can delay the sending of RLC ACKs to the UE until a confirmation of reception at the Donor gNB."

2.1. The First Approach for Reliable Hop-by-Hop ARQ

The first approach needs some "modification of PDCP protocol/procedure" e.g., in order to PDCP data recovery with keeping already sent PDCP PDUs for a certain duration. However, it impairs Rel-15 UE performance as captured in the TR. Furthermore, it may need to have the UE to implement Rel-16 PDCP protocol, which means it cannot fulfil the following requirement captured in the TR.

The IAB design shall at least support the following UEs to connect to an IAB-node.

Rel. 15 NR UE

Legacy LTE UE if IAB supports backhauling of LTE access

In this sense, it could not be a candidate solution for ensuring the end-to-end reliability.

Proposal 1: RAN2 should agree that the "Modification of PDCP" is not a solution for Rel-15 UE, in addition to "Rel-15 UE performance may be impaired."

2.2. The Second Approach for Reliable Hop-by-Hop ARQ

The second approach would introduce a new functionality for "Rerouting of PDCP PDUs buffered on intermediate IAB-nodes in response to a route update", which could be assumed to be implemented within either RLC or Adaptation layer. The route update, for example, might imply more than one following scenarios.

The connection to the parent fails and recovers as another connection to different parent (i.e., RRC Re-establishment). or, The connection to the parent is reconfigured to be changed to different parent (i.e., handover). or, The primary connection in two connections to different parents is switched to the other (i.e., redundant routing by e.g., Dual Connectivity).

In some cases above (e.g., upon handover), the RLC entity may need to be re-established and all RLC SDUs are discarded. So, it's not possible to buffer/re-route any PDCP PDUs unless Rel-15 RLC behavior is changed. On the other hand, it would be considered that the "above-RLC" type of Adaptation layer is suitable for buffering the PDCP PDUs during RLC re-establishment and then re-routing them to (the other) RLC entity associated with an active MAC link.

Proposal 2: RAN2 should agree that the function of buffering/rerouting PDCP PDUs is handled by the Adaptation layer that is located "above-RLC" on intermediate IAB node.

Considering these cases, it could be also considered that the "information needs to be exchanged" is possibly between the IAB donor and the IAB node for e.g., the architecture group 1, in addition to "between IAB nodes" already captured for e.g., the architecture group 2, since it will involve a reconfiguration of RRC. In addition, it may be already impossible to exchange the information between the IAB nodes, because of the route update, e.g., due to RLF. Therefore, it's considered that the TR should not limit the entity of information exchange within IAB nodes.

Proposal 3: RAN2 should agree to add a text "or between IAB donor and IAB node" for the information exchange upon the "Rerouting of PDCP PDUs".

The benefit of the second approach will be that the IAB network recovers the packet loss by itself, even if one of RLC channels fails due to e.g., RLF. On the other hand, it may not be a perfect solution for end-to-end reliability after all. For example, the lossless delivery is not ensured, if an intermediate IAB node cannot get any other connection for rerouting and loses PDCP PDUs eventually, e.g., due to there is no suitable IAB donor/nodes around.

Proposal 4: RAN2 should agree that the "Rerouting of PDCP PDUs" does not ensure lossless delivery at the end, while it improves/recovers packet loss on an intermediate RLC channel as long as another route is found.

2.3. The Third Approach for Reliable Hop-by-Hop ARQ

The third approach, i.e., "Introducing UL status delivery (from the Donor gNB to the IAB node)", is interesting but it's not crystal clear whether any associated/possible solution has been clarified in contributions so far. Thus, it's worth discussing some more details even in the study phase.

Although it's not clarified what the "UL status delivery" is at this point, the purpose of this is to allow "the IAB node can delay the sending of RLC ACKs to the UE until a confirmation of reception at the Donor gNB", in order to e.g., buffering PDCP PDUs on the PDCP layer of UE and enabling PDCP data recovery. So, no impact to the Rel-15 PDCP is expected due to the new mechanism, which may be introduced in RLC layer on the IAB node.

Proposal 5: RAN2 should discuss whether the impact of third approach is limited within IAB network (i.e., on IAB donor and IAB nodes).

If Proposal 3 is agreeable, a couple of options to confirm the status UL delivery to the IAB donor, from the perspective of an edge IAB node, as follows.

Option 1: The UL delivery status reporting is sent from the IAB donor to the edge IAB node directly, whereby the RLC ACK takes into account both its own reception status and the UL delivery status reporting.

Option 2: The STATUS PDU (i.e., ACK) is sent between peer RLC entity as it is today, whereby the RLC ACK takes into account the successful reception in RLC entity of not only its own but also the parent node.

Option 1 is a straightforward interpretation of the sentence captured in the TR, while some complexity is observed in terms of sending each UL delivery status reporting to each edge IAB node. It may be possible to result in additional signaling overhead over backhaul links since the new reporting is different from the usual RLC ACK (i.e., STATUS PDU).

Option 2 is a simple alternative like the bucket relay game of RLC ACK, whereby the IAB nodes just send the existing RLC ACK after these receive associated RLC ACK from its parent node. The benefit is that it does not need any additional signaling and provides scalability (i.e., no limitation on number of hops). The drawback is that the UE may wait for a longer time to receive the STATUS PDU from the IAB node, but it's no worse than Option 1.

Since it's still in the study phase, both options should be captured in the TR if these are identified as beneficial.

Proposal 6: RAN2 should agree to capture the details of "UL status delivery" in the TR, especially the IAB node considers the UL delivery status reporting from the IAB donor (Option 1) and the RLC ACK form its parent node (Option 2).

The invention claimed is:

1. A relay apparatus for use in a mobile communication system, comprising:
a reception side RLC entity configured to receive data from a first communication apparatus;
a transmission side RLC entity configured to transmit, to a second communication apparatus, the data received by the reception side RLC entity; and
an upper entity positioned in an upper layer than the reception side RLC entity and the transmission side RLC entity,
wherein the transmission side RLC entity is configured to receive, from the second communication apparatus, a first acknowledgement indicating that the second communication apparatus has successfully received the transmitted data,
the reception side RLC entity is configured to transmit, to the first communication apparatus, a second acknowledgement indicating that the reception side RLC entity has successfully received the data after waiting until the transmission side RLC entity receives the first acknowledgement,
the upper entity is configured to acquire, from the transmission side RLC entity, information regarding the first acknowledgement, and provide the acquired information to the reception side RLC entity, and
the reception side RLC entity is configured to confirm that the transmission side RLC entity has received the first acknowledgement based on the information received from the upper entity.

2. The relay apparatus according to claim 1, wherein
the reception side RLC entity is configured to count a waiting time from receiving the data from the first communication apparatus until the transmission side RLC entity receives the first acknowledgement, and
when the waiting time exceeds a certain period of time, the reception side RLC entity transmits, to the first communication apparatus, a negative acknowledgement indicating that the reception side RLC entity has failed to receive the data.

3. The relay apparatus according to claim 1, wherein
the second communication apparatus is another relay apparatus that intervenes in communication between the relay apparatus and a donor base station,
the transmission side RLC entity transmits, to an RLC entity provided in the another relay apparatus, the data received by the reception side RLC entity, and
the transmission side RLC entity receives the first acknowledgement from the RLC entity provided in the another relay apparatus.

4. A method comprising:
receiving, by a reception side RLC entity of a relay apparatus, data from a first communication apparatus
transmitting, by a transmission side RLC entity of the relay apparatus to a second communication apparatus, the data received by the reception side RLC entity;
receiving, by the transmission side RLC entity from the second communication apparatus, a first acknowledgement indicating that the second communication apparatus has successfully received the transmitted data;
transmitting, by the reception side RLC entity to the first communication apparatus, a second acknowledgement indicating that the reception side RLC entity has successfully received the data after waiting until the transmission side RLC entity receives the first acknowledgement;
acquiring, by an upper entity positioned in an upper layer than the reception side RLC entity and the transmission side RLC entity, from the transmission side RLC entity, information regarding the first acknowledgement;
providing, by the upper entity, the acquired information to the reception side RLC entity, and confirming, by the reception side RLC entity, that the transmission side RLC entity has received the first acknowledgement based on the information received from the upper entity.

5. An apparatus for controlling a relay apparatus for use in a mobile communication system, the apparatus comprising: a processor and a memory, the processor configured to:
receive, by a reception side RLC entity of the relay apparatus, data from a first communication apparatus transmit, by a transmission side RLC entity of the relay apparatus to a second communication apparatus, the data received by the reception side RLC entity;

receive, by the transmission side RLC entity from the second communication apparatus, a first acknowledgement indicating that the second communication apparatus has successfully received the transmitted data;

transmit, by the reception side RLC entity to the first communication apparatus, a second acknowledgement indicating that the reception side RLC entity has successfully received the data after waiting until the transmission side RLC entity receives the first acknowledgement;

acquire, by an upper entity positioned in an upper layer than the reception side RLC entity and the transmission side RLC entity, from the transmission side RLC entity, information regarding the first acknowledgement;

provide, by the upper entity, the acquired information to the reception side RLC entity, and confirm, by the reception side RLC entity, that the transmission side RLC entity has received the first acknowledgement based on the information received from the upper entity.

* * * * *